(12) United States Patent
Komai

(10) Patent No.: US 11,039,093 B2
(45) Date of Patent: Jun. 15, 2021

(54) IMAGE SENSOR AND ELECTRONIC CAMERA

(71) Applicant: NIKON CORPORATION, Tokyo (JP)

(72) Inventor: Atsushi Komai, Tokorozawa (JP)

(73) Assignee: NIKON CORPORATION, Tokyo (JP)

(*) Notice: Subject to any disclaimer, the term of this patent is extended or adjusted under 35 U.S.C. 154(b) by 0 days.

(21) Appl. No.: 16/498,688

(22) PCT Filed: Mar. 28, 2018

(86) PCT No.: PCT/JP2018/012978
§ 371 (c)(1),
(2) Date: Sep. 27, 2019

(87) PCT Pub. No.: WO2018/181583
PCT Pub. Date: Oct. 4, 2018

(65) Prior Publication Data
US 2020/0036917 A1  Jan. 30, 2020

(30) Foreign Application Priority Data

Mar. 28, 2017 (JP) .............................. JP2017-063197

(51) Int. Cl.
*H04N 5/347* (2011.01)
*H04N 5/374* (2011.01)

(52) U.S. Cl.
CPC ............ *H04N 5/347* (2013.01); *H04N 5/374* (2013.01)

(58) Field of Classification Search
CPC ........ H04N 5/347; H04N 5/374; H04N 5/378; H04N 5/3658; H04N 5/2176; H04N 5/335;

(Continued)

(56) References Cited

U.S. PATENT DOCUMENTS 7,375,748 B2 * 5/2008 Krymski .............. H04N 5/3575
348/241
8,913,168 B2 * 12/2014 Matsuda ........... H01L 27/14812
348/302

(Continued)

FOREIGN PATENT DOCUMENTS

CN       105282458 A     1/2016
JP     2010-259027 A    11/2010

(Continued)

OTHER PUBLICATIONS

May 29, 2018 International Search Report issued in International Patent Application No. PCT/JP2018/012978.

(Continued)

*Primary Examiner* — Pritham D Prabhakher
(74) *Attorney, Agent, or Firm* — Oliff PLC

(57) ABSTRACT

An image sensor, includes: a plurality of pixels arranged along a first direction, each of which includes a photoelectric conversion unit that generates an electric charge through photoelectric conversion of light, and outputs a signal generated based upon the electric charge generated in the photoelectric conversion unit; a first signal line to which signals from one or more pixels among the plurality of pixels are output; a second signal line to which a signal from another pixel among the plurality of pixels is output; and an arithmetic unit that executes an arithmetic operation with a signal generated by combining the signals from the one or more pixels output to the first signal line and the signal output to the second signal line.

17 Claims, 10 Drawing Sheets

(58) Field of Classification Search
CPC . H04N 9/045; H04N 9/04557; H04N 9/04511
USPC .......................................................... 348/308
See application file for complete search history.

(56) References Cited

U.S. PATENT DOCUMENTS

| | | | |
|---|---|---|---|
| 9,319,610 B2* | 4/2016 | Wakabayashi | H04N 5/35545 |
| 10,021,335 B2* | 7/2018 | Niwa | H04N 5/37455 |
| 2004/0051802 A1* | 3/2004 | Krymski | H04N 5/361 |
| | | | 348/308 |
| 2010/0271522 A1 | 10/2010 | Matsunaga et al. | |
| 2011/0242351 A1* | 10/2011 | Shoji | H01L 27/14645 |
| | | | 348/222.1 |
| 2013/0107087 A1* | 5/2013 | Okada | H04N 5/365 |
| | | | 348/280 |
| 2015/0288903 A1 | 10/2015 | Oshima et al. | |
| 2015/0350580 A1 | 12/2015 | Sato | |
| 2016/0037100 A1* | 2/2016 | Ino | H01L 27/14634 |
| | | | 348/241 |
| 2016/0293648 A1* | 10/2016 | Soda | H04N 9/04557 |
| 2016/0323528 A1* | 11/2016 | Mabuchi | H01L 27/14612 |
| 2017/0019583 A1* | 1/2017 | Kobayashi | H04N 5/369 |
| 2017/0041563 A1* | 2/2017 | Suzuki | H04N 5/37457 |
| 2017/0201702 A1* | 7/2017 | Niwa | H01L 27/14612 |
| 2017/0214877 A1* | 7/2017 | Shim | H01L 27/14612 |

FOREIGN PATENT DOCUMENTS

| | | |
|---|---|---|
| JP | 2015-201736 A | 11/2015 |
| JP | 2015-228544 A | 12/2015 |

OTHER PUBLICATIONS

Mar. 29, 2021 Office Action issued in Chinese Patent Application No. 201880022491.6.

* cited by examiner (a)

(b)

(c)

(d)

(a)

(b)

IMAGE SENSOR AND ELECTRONIC CAMERA

TECHNICAL FIELD

The present invention relates to an image sensor and an electronic camera.

BACKGROUND ART

An image-capturing device is known in the related art that combines pixel signals on a vertical signal line (PTL 1). There is an issue with respect to the image-capturing device in the related art in that a signal closely approximating the average of a plurality of pixel signals may not be obtained.

CITATION LIST

Patent Literature

PTL 1: Japanese Laid Open Patent Publication No. 2010-259027

SUMMARY OF INVENTION

According to the first aspect of the present invention, an image sensor, comprises: a plurality of pixels arranged along a first direction, each of which includes a photoelectric conversion unit that generates an electric charge through photoelectric conversion of light, and outputs a signal generated based upon the electric charge generated in the photoelectric conversion unit; a first signal line to which signals from one or more pixels among the plurality of pixels are output; a second signal line to which a signal from another pixel among the plurality of pixels is output; and an arithmetic unit that executes an arithmetic operation with a signal generated by combining the signals from the one or more pixels output to the first signal line and the signal output to the second signal line.

According to the second aspect of the present invention, an electronic camera, comprises: the image sensor according to the first aspect; and an image generation unit that generates image data based upon signals from the plurality of pixels.

DESCRIPTION OF EMBODIMENTS

First Embodiment

Figure 1:
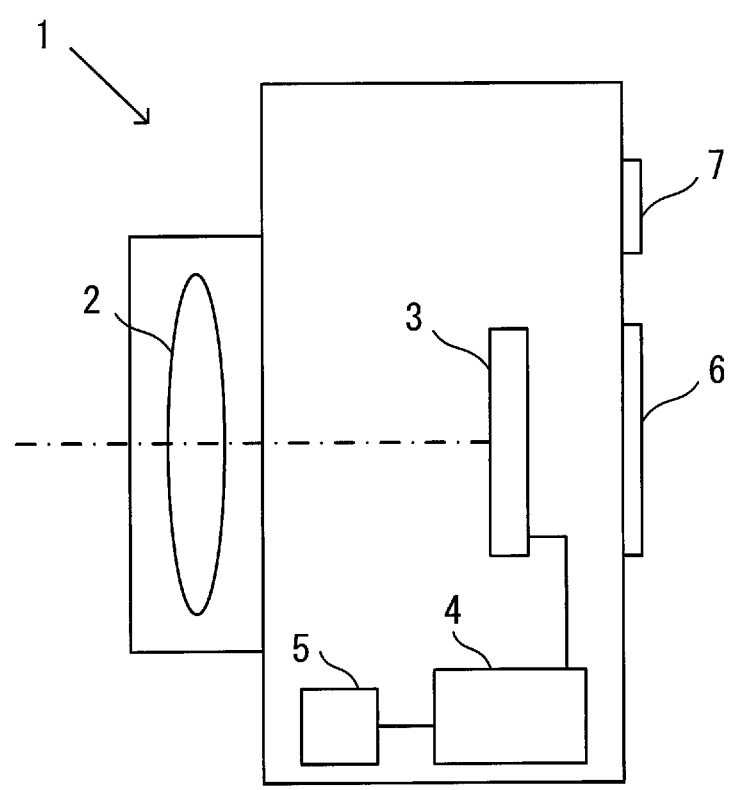
FIG. 1 A block diagram illustrating the structure of the image-capturing device according to a first embodiment FIG. 2 A circuit diagram illustrating the pixel structure adopted in the image sensor according to the first embodiment FIG. 3 A circuit diagram illustrating part of the structure of the image sensor according to the first embodiment in an abridged presentation FIG. 4 Charts indicating how pixel signals are combined in the image sensor according to the first embodiment FIG. 5 Charts schematically illustrating the pixel signal combination processing executed according to the first embodiment FIG. 6 A block diagram illustrating part of the structure of the image sensor according to a second embodiment FIG. 7 Charts schematically illustrating the pixel signal combination processing executed according to the second embodiment FIG. 8 A diagram explaining a circuit structure assumed part of the image sensor according to the second embodiment and an operation example that may be executed in the image sensor FIG. 9 A diagram explaining a circuit structure assumed in part of the image sensor according to the second embodiment and an another operation example that may be executed in the image sensor FIG. 10 A circuit diagram illustrating part of the structure in the image sensor according to a variation 1

FIG. 1 is a block diagram illustrating the structure of the image-capturing device according to the first embodiment. The image-capturing device in the first embodiment may be an electronic camera 1 (hereafter will be referred to as a camera 1) adopting a structure such as that shown in FIG. 1. The camera 1 comprises an image-capturing optical system (image forming optical system) 2, an image sensor 3, a control unit 4, a memory 5, a display unit 6 and an operation unit 7. The image-capturing optical system 2, which includes a plurality of lenses such as a focus adjustment lens (focusing lens) and an aperture, forms a subject image at the image sensor 3. It is to be noted that the image-capturing optical system 2 may be a detachable system that can be mounted at and dismounted from the camera 1.

The image sensor 3 may be, for instance, a CMOS image sensor. The image sensor 3 captures a subject image formed via the image-capturing optical system 2. As will be described in detail later, a plurality of pixels, each having a photoelectric conversion unit, are arranged in a two dimensional array at the image sensor 3. The photoelectric conversion unit may be constituted with, for instance, a photodiode (PD). The image sensor 3 generates pixel signals through photoelectric conversion of light having entered therein and outputs the generated pixel signals to the control unit 4. A pixel signal is generated based upon an electric charge resulting from photoelectric conversion at the photoelectric conversion unit.

The memory 5 may be, for instance, a recording medium such as a memory card. Image data and the like are recorded into the memory 5. Data are written into and read out from the memory 5 by the control unit 4. The display unit 6 displays, an image based upon image data, photographic information indicating the shutter speed, the aperture value, etc., a menu screen and the like. The operation unit 7, which includes a release button, various setting switches such as a power switch, and the like, outputs an operation signal corresponding to a given operation to the control unit 4.

The control unit 4, configured with a CPU, a ROM, a RAM and the like, controls various components of the camera 1 based upon a control program. The control unit 4 generates image data by executing various types of image processing on pixel signals output from the image sensor 3. In other words, the control unit 4 also functions as an image generation unit 4 that generates still image data and video image data based upon pixel signals. The various types of image processing include image processing of the known art such as gradation conversion processing, color interpolation processing and edge enhancement processing.

The control unit 4 executes processing through which pixel signals from each of the pixels at the image sensor 3 are individually read out (a first control mode) and processing through which signals from a plurality of pixels at the image sensor 3 are combined and the resulting combined signal is read out (a second control mode). For instance, when executing a photographing operation for capturing a high-resolution still image, the control unit 4 selects the first control mode so as to read out pixel signals from the individual pixels separately. In addition, when executing a video shooting operation, the control unit 4 selects the second control mode so as to read out a signal by combining pixel signals from a plurality of pixels.

Figure 2:
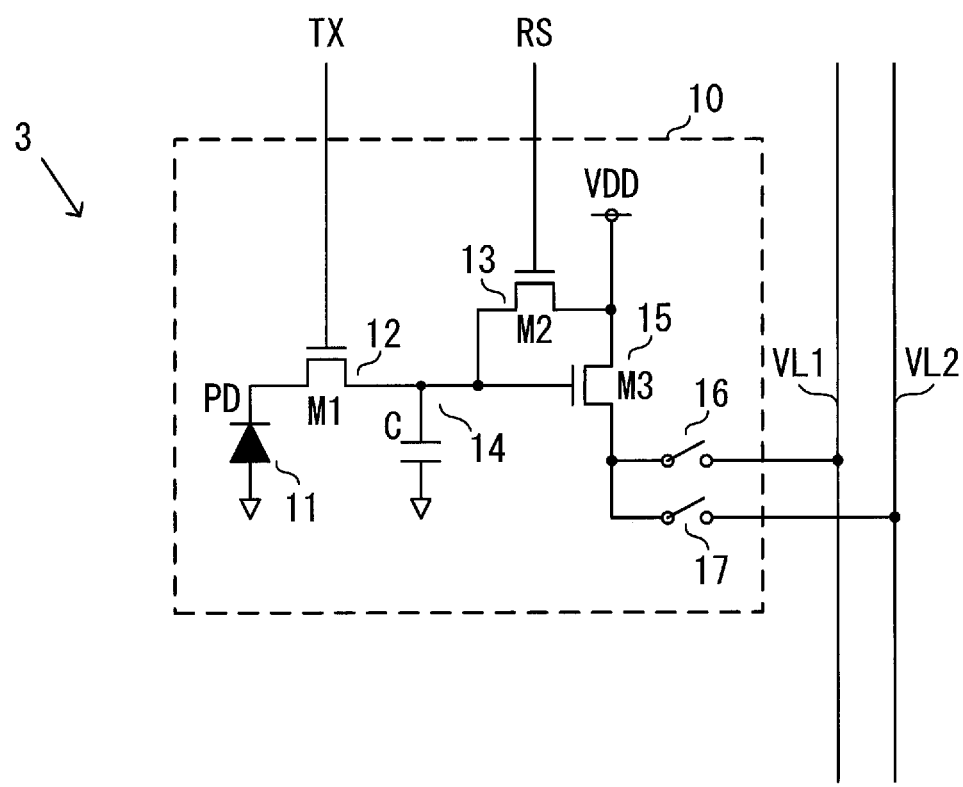

FIG. 2 is a circuit diagram illustrating the pixel structure adopted in the image sensor 3 according to the first embodiment. A pixel 10 includes a photoelectric conversion unit 11, a transfer unit 12, a reset unit 13, a floating diffusion (FD) 14, an amplifier unit 15, a first selection unit 16 and a second selection unit 17. The photoelectric conversion unit 11, constituted with a photodiode PD, has a function of converting light having entered therein to an electric charge and accumulating the electric charge resulting from the photoelectric conversion.

The transfer unit 12, which is constituted with a transistor M1 controlled with a drive signal ØTX, transfers the electric charge resulting from photoelectric conversion at the photoelectric conversion unit 11 to the FD 14. Namely, the transfer unit 12 forms an electric charge transfer path between the photoelectric conversion unit 11 and the FD 14. The transistor M1 is a transfer transistor. The electric charge transferred to the FD 14 is accumulated (held) in a capacitor C at the FD 14. The FD 14 also functions as an accumulating unit 14 that accumulates an electric charge.

The amplifier unit 15 amplifies a signal generated based upon the electric charge accumulated in the capacitor C at the FD 14, and outputs the amplified signal. The amplifier unit 15 is constituted with a transistor M3, a drain (terminal) and a gate (terminal) of which are respectively connected to a source VDD and the FD 14. In addition, a source (terminal) of the transistor M3 is connected to a first vertical signal line VL1 via the first selection unit 16, and is also connected to a second vertical signal line VL2 via the second selection unit 17. The amplifier unit 15 functions as part of a source follower circuit with electric current sources (electric current sources 25 and 26 in FIG. 3) acting as load current sources thereof. The transistor M3 is an amplifier transistor. The reset unit 13, which is constituted with a transistor M2 controlled with a drive signal ØRS, resets the electric charge in the capacitor C and resets the voltage at the FD 14. The transistor M2 is a reset transistor.

The first selection unit 16, constituted with a transistor, also functions as a first connection unit 16 that connects the amplifier unit 15 with the first vertical signal line VL1 or disconnects them from each other. The transistor constituting the first selection unit 16 outputs the signal from the amplifier unit 15 to the first vertical signal line VL1 when it is in an ON state. In addition, the second selection unit 17, constituted with a transistor, also functions as a second connection unit 17 that connects the amplifier unit 15 with the second vertical signal line VL2 or disconnects them from each other. The transistor constituting the second selection unit 17 outputs the signal from the amplifier unit 15 to the second vertical signal line VL2 when it is in an ON state. The transistor constituting the first selection unit 16 is a first selection transistor, whereas the transistor constituting the second selection unit 17 is a second selection transistor.

Figure 3:
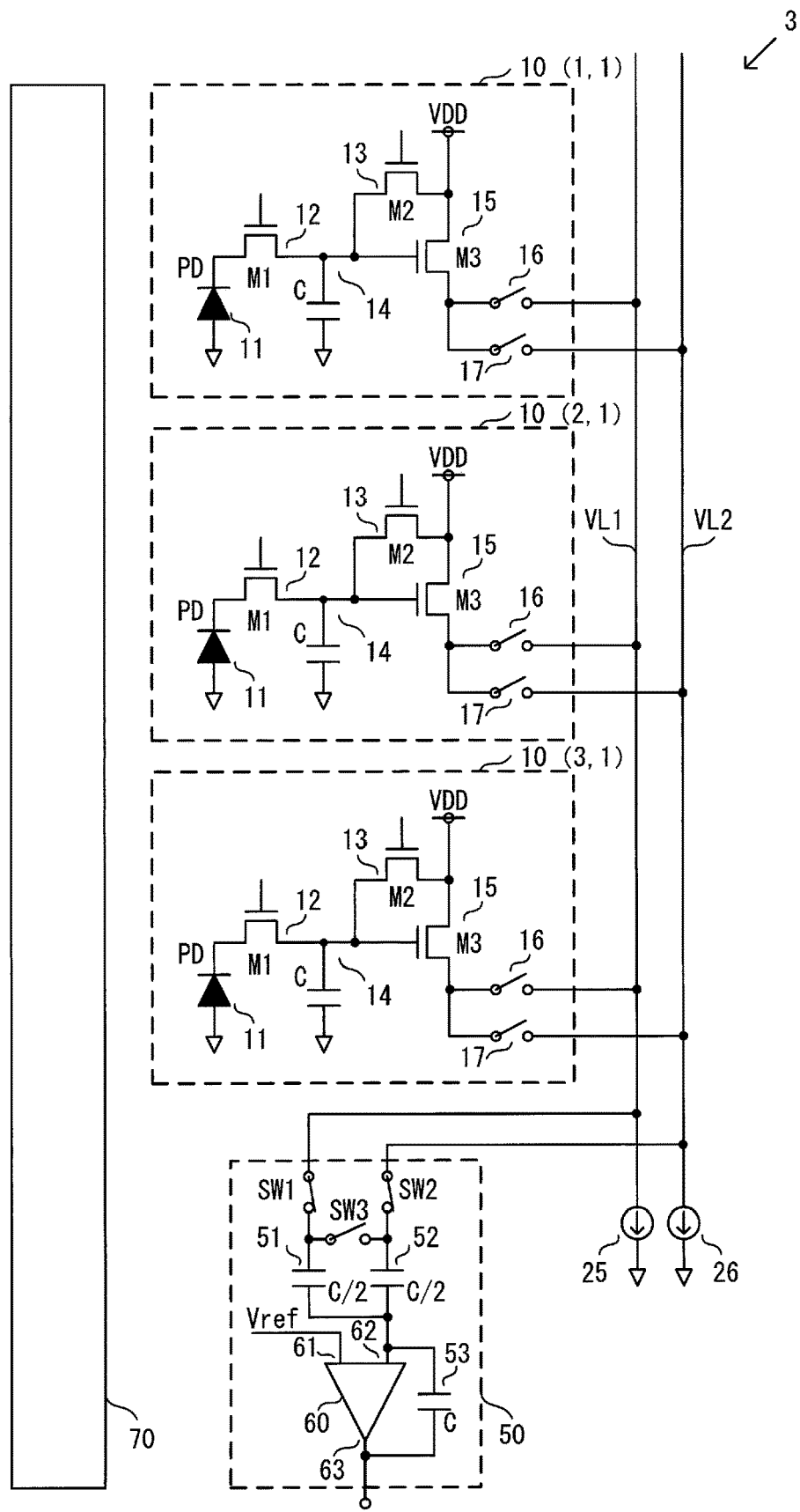

FIG. 3 shows part of a pixel column among a plurality of pixel columns disposed so as to extend along a column direction (vertical direction) designated as a first direction in which a plurality of pixels 10 are arranged, as well as in a row direction (horizontal direction) designated as a second direction running perpendicular to the first direction. A pixel column structure shown in FIG. 3 is also adopted in other pixel columns. The image sensor 3 includes a plurality of pixels 10, an arithmetic unit 50 and a vertical control unit 70. It is to be noted that the vertical control unit 70 is disposed as a common control unit that serves the plurality of pixel columns.

Furthermore, a first vertical signal line VL1 and a second vertical signal line VL2 are disposed in conjunction with a pixel column made up with a plurality of pixels 10 set side-by-side along the column direction, i.e., along the longitudinal direction, at the image sensor 3. A first electric current source 25 is disposed in correspondence to the first vertical signal line VL1, whereas a second electric current source 26 is disposed in correspondence to the second vertical signal line VL2. Moreover, an arithmetic unit 50 is disposed in correspondence to the first vertical signal line VL1 and the second vertical signal line VL2. It is to be noted that while FIG. 3 only shows one pixel (across)×three pixels (down) as pixels 10 so as to simplify the illustration, the image sensor 3 includes several million through several hundred million pixels, or an even greater number of pixels. In addition, the pixel 10 at the upper end is designated as a pixel 10 (1, 1), the pixel 10 at the center is designated as a pixel 10 (2, 1) and the pixel 10 at the lower end is designated as a pixel 10 (3, 1) in FIG. 3.

The first electric current source 25 is connected to the individual pixels 10 via the first vertical signal line VL1, whereas the second electric current source 26 is connected to the individual pixels 10 via the second vertical signal line VL2. The first electric current source 25 and the second electric current source 26 each generate an electric current used to read out signals from each of the pixels 10. The first electric current source 25 provides an electric current having been generated therein to the first vertical signal line VL1 and to the first selection unit 16 and the amplifier unit 15 in each pixel 10. Likewise, the second electric current source 26 provides an electric current having been generated therein to the second vertical signal line VL2 and to the second selection unit 17 and the amplifier unit 15 in each pixel 10. It is to be noted that the electric current provided from the first electric current source 25 and the electric current provided from the second electric current source 26 assume values substantially equal to each other.

The arithmetic unit 50, which is configured so as to include an amplification unit 60, capacitors 51, 52 and 53 and switches SW1, SW2 and SW3, executes an arithmetic operation so as to add together a signal input to the capacitor 51 and a signal input to the capacitor 52. ON/OFF control of the switches SW1, SW2 and SW3, each constituted with a transistor, is executed by the vertical control unit 70.

The capacitor 51 is a capacitor (input capacitor), one terminal of which is connected to the first vertical signal line VL1 via the switch SW1 and another terminal of which is connected to an input terminal 62 of the amplification unit 60. The capacitor 52 is a capacitor (input capacitor), one terminal of which is connected to the second vertical signal line VL2 via the switch SW2 and another terminal of which is connected to the input terminal 62 of the amplification unit 60. In addition, the capacitor 53 is a capacitor (feedback capacitor), one terminal of which is connected to the input terminal 62 of the amplification unit 60 and another terminal of which is connected to an output terminal 63 of the amplification unit 60. The capacitor 53 assumes a capacitance value C, whereas the capacitors 51 and 52 each assume a capacitance value that is half the capacitance value C, i.e., ½ C. A reference signal Vref sustaining a constant voltage is input to an input terminal 61 of the amplification unit 60.

The arithmetic unit 50 outputs, from the output terminal 63, a signal obtained by adding together the signal input to the capacitor 51 and the signal input to the capacitor 52 and averaging these signals. Namely, the arithmetic unit 50 is an adding unit 50 that adds together a plurality of signals input thereto. The signal output from the arithmetic unit 50 first undergoes signal processing via an analog/digital conversion unit (A/D conversion unit) and the like (not shown) and is then output to the control unit 4 of the camera 1.

Based upon a signal provided from the control unit 4 in the camera 1, the vertical control unit 70 provides the drive signal ØTX to the transfer unit 12 in each pixel 10 and provides the drive signal ØRS to the reset unit 13 of each pixel 10. In addition, the vertical control unit 70 individually controls the ON/OFF states of the first selection unit 16 and the second selection unit 17 by individually providing a drive signal to the first selection unit 16 and the second selection unit 17. To describe this in further detail, the vertical control unit 70 provides drive signals to the gates of the transistors constituting the first selection unit 16 and the second selection unit 17 to set a given transistor in an ON state (a connected state, a conductions state, a short-circuit state) or in an OFF state (a disconnected state, a non-conduction state, an open state, a blocked state). As explained above, the vertical control unit 70 controls the operation of each pixel 10 by providing drive signals to the pixel 10.

Next, the first control mode will be explained. When the first control mode is selected by the control unit 4, the image sensor 3 individually and separately reads out pixel signals from all the pixels 10 at the image sensor 3. The vertical control unit 70 sequentially selects pixels 10 at the image sensor 3 in units of rows, starting with the pixel 10 in the uppermost row and moving toward the pixel 10 in the lowermost row (from the pixel 10 (1, 1) toward the pixel 10 (3, 1) in the example presented in FIG. 3) and sequentially reads out pixel signals from the pixels 10. The pixel signal readout method adopted in the first control mode will be explained in more specific detail.

The vertical control unit 70 sets the first selection unit 16 in an ON state and sets the second selection unit 17 in an OFF state at the pixel 10 (1, 1) in the first row. The vertical control unit 70 sets the first selection units 16 and the second selection units 17 in the pixels 10 in rows other than the first row in an OFF state. In the example presented in FIG. 3, the first selection units 16 and the second selection units 17 in the pixel 10 (2, 1) and the pixel 10 (3, 1) are all set in an OFF state. In addition, the vertical control unit 70 sets the switch SW1 and the switch SW3 in an ON state and sets the switch SW2 in an OFF state at the arithmetic unit 50.

A pixel signal generated based upon an electric charge generated in the photoelectric conversion unit 11 of the pixel 10 (1, 1) in the first row is read out to the first vertical signal line VL1 via the first selection unit 16 of the pixel 10 (1, 1). Since the switches SW1 and SW3 are both in an ON state, the pixel signal from the pixel 10 (1, 1) having been output on the first vertical signal line VL1 is input to both the capacitor 51 and the capacitor 52. The arithmetic unit 50 outputs, via the output terminal 63, a signal obtained by adding together and averaging the pixel signal from the pixel 10 (1, 1) input to the capacitor 51 and the pixel signal from the pixel 10 (1, 1) input to the capacitor 52, as a pixel signal derived from the pixel 10 (1, 1).

After reading out the pixel signal from the pixel 10 in the first row, the vertical control unit 70 sets the first selection unit 16 in an ON state and sets the second selection unit 17 in an OFF state at the pixel 10 (2, 1) in the second row. In addition, the vertical control unit 70 sets the first selection units 16 and the second selection units 17 in the pixels 10 in rows other than the second row in an OFF state. A pixel signal from the pixel 10 (2, 1) is read out to the first vertical signal line VL1 via the first selection unit 16 of the pixel 10 (2, 1). The arithmetic unit 50 outputs, via the output terminal 63, a signal obtained by adding together and averaging the pixel signal from the pixel 10 (2, 1) input to the capacitor 51 and the pixel signal from the pixel 10 (2, 1) input to the capacitor 52.

Likewise, after reading out the pixel signal from the pixel 10 in the second row, the vertical control unit 70 sets the first selection unit 16 in an ON state and sets the second selection unit 17 in an OFF state at the pixel 10 (3, 1) in the third row. In addition, the vertical control unit 70 sets the first selection units 16 and the second selection units 17 in the pixels 10 in rows other than the second row in an OFF state. As a result, the pixel signal from the pixel 10 (3, 1) is read out to the first vertical signal line VL1 and is then input to both the capacitor 51 and the capacitor 52. The arithmetic unit 50 outputs, via the output terminal 63, a signal obtained by adding together and averaging the pixel signal from the pixel 10 (3, 1) input to the capacitor 51 and the pixel signal from the pixel 10 (3, 1) input to the capacitor 52.

As described above, in the first control mode, pixels 10 are sequentially selected in units of rows and pixel signals from the individual pixels 10 are read out to first vertical signal lines VL1 at the image sensor 3 set. The pixel signals sequentially output from the pixels 10 first undergo signal processing via arithmetic units 50, A/D conversion units and the like before they are output to the control unit 4. The control unit 4 generates image data (e.g., still image data) by using the pixel signals from all the pixels output from the image sensor 3.

It is to be noted that while the pixel signal from each pixel 10 is read out to the first vertical signal line VL1 in the example described above, the pixel signal from a pixel 10 can be read out to the second vertical signal line VL2 by setting the first selection unit 16 in an OFF state and setting the second selection unit 17 in an ON state. In such a case, the vertical control unit 70 sets the switch SW2 and the switch SW3 in an ON state and the switch SW1 in an OFF state at the arithmetic unit 50.

It is to be noted that pixel signals from pixels in two rows may be read out simultaneously by reading out the pixel signals from pixels in one row to the first vertical signal lines VL1 and reading out the pixel signals from pixels in the other row to the second vertical signal lines VL2. In this case, two arithmetic units 50 may be disposed in correspondence to each pixel column so as to simultaneously (concurrently) execute signal processing on the pixel signal output on the first vertical signal line VL1 and the pixel signal output on the second vertical signal line VL2 and output the pixel signals having undergone the concurrent signal processing to the control unit 4. In the example presented in FIG. 3, the vertical control unit 70 may, for instance, set the first selection unit 16 in an ON state at the pixel 10 (1, 1) in the first row and the second selection unit 17 in an OFF state at the pixel 10 (1, 1), and also set the first selection unit 16 in an OFF state at the pixel 10 (2, 1) in the second row and the second selection unit 17 in an ON state at the pixel 10 (1, 1). In this situation, the pixel signal from the pixel 10 (1, 1) will be read out to the first vertical signal line VL1 and the pixel signal from the pixel 10 (2, 1) will be read out to the second vertical signal line VL2. Once a simultaneous readout for the first row and the second row is completed, a simultaneous readout will be executed to read out pixel signals from the pixels in the third row and the fourth row. Subsequently, simultaneous readouts from the pixels in pairs of rows, each made up with an odd-numbered row and an even-numbered row adjacent to each other, will be executed in sequence. Through this process, pixel signals from the pixels in two rows can be read out simultaneously.

The second control mode will be explained next. The image sensor 3 set in the second control mode by the control unit 4 reads out a signal by combining (synthesizing) signals from a plurality of pixels 10. For instance, the image sensor 3 may combine pixel signals from three pixels 10 arranged side-by-side along the column direction and output the combined pixel signal to the control unit 4. Namely, the image sensor 3 may read out signals each obtained by combining signals from three pixels arranged along the column direction. In the example presented in FIG. 3, the image sensor 3 outputs a combined pixel signal obtained by combining the pixel signals from the pixel 10 (1, 1), the pixel 10 (2, 1) and the pixel 10 (3, 1), to the control unit 4. The pixel 10 (2, 1) is a pixel at the central position among the three combination target pixels 10. At the image sensor 3, the pixel signal readout (readout method) from the individual pixels 10 is controlled when generating a pixel signal by combining signals from a plurality of pixels 10 so as to obtain a pixel signal with the greatest weight applied to the pixel signal from the pixel 10 at the central position. The following is a more detailed explanation of the pixel signal readout method adopted in the second control mode.

The vertical control unit 70 sets the first selection units 16 in an ON state and sets the second selection units 17 in an OFF state at the pixels 10 (1, 1) and 10 (3, 1) in the first row and the third row. In addition, the vertical control unit 70 sets the first selection unit 16 in an OFF state and the second selection unit 17 in an ON state at the pixel 10 (2, 1) in the second row. The vertical control unit 70 also sets the switch SW1 and the switch SW2 in an ON state and sets the switch SW3 in an OFF state at the arithmetic unit 50.

As the first selection units 16 at the pixel 10 (1, 1) and the pixel 10 (3, 1) enter an ON state, the source terminals at the amplifier units 15 in the pixel 10 (1, 1) and the pixel 10 (3, 1) become electrically connected to the first vertical signal line VL1. An electric current from the first electric current source 25 connected to the first vertical signal line VL1 is shunted (divided) and distributed to the pixel 10 (1, 1) and the pixel 10 (3, 1). On the first vertical signal line VL1, the pixel signal from the pixel 10 (1, 1) and the pixel signal from the pixel 10 (3, 1) are combined and a combined pixel signal is generated.

In this situation, if the difference between the potential at the FD 14 in the pixel 10 (1, 1) and the potential at the FD 14 in the pixel 10 (3, 1) is small, the first electric current source 25 provides substantially equal electric currents to the pixel 10 (1, 1) and the pixel 10 (3, 1). As a result, the combined pixel signal output on the first vertical signal line VL1 assumes a signal level (voltage) corresponding to the average (value) of the potentials at the FDs 14 in the pixel 10 (1, 1) and the pixel 10 (3, 1).

If, on the other hand, the difference between the potentials at the FDs 14 in the pixel 10 (1, 1) and the pixel 10 (3, 1) is significant, a greater electric current will flow from the electric current source 25 to the amplifier unit 15 of the pixel with the FD 14 thereof at the higher potential. This means that when the signals are combined on the first vertical signal line VL1, a greater weight is applied the signal from the pixel with the FD 14 thereof at the higher potential in comparison to the weight applied to the signal from the pixel with the FD 14 thereof at the lower potential. Namely, the combined pixel signal output on the first vertical signal line VL1 will have a signal level closer to the signal level corresponding to the potential at the FD 14 in the pixel with the FD 14 thereof at the higher potential, instead of a signal level corresponding to the average of the potentials at the FDs 14 in the pixel 10 (1, 1) and the pixel 10 (3, 1).

As the second selection unit 17 in the pixel 10 (2, 1) at the central position enters an ON state, the pixel 10 (2, 1) becomes electrically connected to the second vertical signal line VL2. Since the second selection units 17 in the pixel 10 (1, 1) and the pixel 10 (3, 1) are in an OFF state, the pixel 10 (2, 1) at the central position alone is connected to the second vertical signal line VL2. As a result, an electric current provided from the second electric current source 26 will flow to the second selection unit 17 and the amplifier unit 15 in the pixel 10 (2, 1) at the central position in its entirety without becoming divided or shunted. A pixel signal corresponding to the potential at the FD 14 in the pixel 10 (2, 1) at the central position will be output on the second vertical signal line VL2.

The combined pixel signal obtained by combining the signal from the pixel 10 (1, 1) and the signal from the pixel 10 (3, 1) will be input via the first vertical signal line VL1 and the switch SW1 to the capacitor 51 in the arithmetic unit 50. The pixel signal from the pixel 10 (2, 1) at the central position will be input via the second vertical signal line VL2 and the switch SW2 to the capacitor 52 in the arithmetic unit 50. The arithmetic unit 50 will then output, through the output terminal 63, a pixel signal (sum pixel signal) obtained by adding together and averaging the combined pixel signal having been input to the capacitor 51 and the pixel signal from the pixel 10 (2, 1) at the central position having been input to the capacitor 52. The sum pixel signal output through the output terminal 63 will be a signal generated by combining the signals from the pixel 10 (1, 1), the pixel 10 (2, 1) and the pixel 10 (3, 1).

In the example described above, the electric current from the first electric current source 25 is shunted and provided to the pixel 10 (1, 1) and the pixel 10 (3, 1) and a combined pixel signal obtained by combining the pixel signal from the pixel 10 (1, 1) and the pixel signal from the pixel 10 (3, 1) is read out to the first vertical signal line VL1. The electric current from the second electric current source 26 is provided in its entirety to the pixel 10 (2, 1) at the central position and the pixel signal from the pixel 10 (2, 1) is read out to the second vertical signal line VL2. Then, a sum pixel signal is generated at the arithmetic unit 50 by adding together and averaging the combined pixel signal derived from the pixel 10 (1, 1) and the pixel 10 (3, 1) and the pixel signal from the pixel 10 (2, 1). Through this process, a sum pixel signal can be obtained by applying the greatest weight to the pixel signal from the pixel 10 (2, 1) at the central position among the three pixels.

Through the pixel signal readout method described above, sum pixel signals derived from the pixels 10 in three rows, i.e., the first through third rows, are read out. Once the sum pixel signals derived from the pixels 10 in the first through third rows are read out, the vertical control unit 70 reads out sum pixel signals derived from the pixels 10 in the fourth through sixth rows. Through the second control mode described above, sum pixel signals are read out sequentially in units of three rows. The sum pixel signals, each generated by combining signals from three pixels disposed consecutively along the column direction, which are output in sequence from the arithmetic units 50, first undergo signal processing at A/D conversion units and the like and are then output to the control unit 4. The control unit 4 generates image data (e.g., video image data) by using the sum pixel signals output from the image sensor 3.

In the second control mode described above, the vertical control unit 70 reads out the pixel signals from the top pixel and the bottom pixel among the three pixels disposed consecutively along the column direction, which are designated as combination-target pixels, to the first vertical signal line VL1 and combines them on the first vertical signal line VL1, whereas it reads out the pixel signal from the pixel at the center to the second vertical signal line VL2. The arithmetic unit 50 then generates a sum pixel signal by adding together and averaging the combined pixel signal having been output on the first vertical signal line VL1 and the pixel signal from the pixel at the center, having been output on the second vertical signal line VL2. Through these measures, it becomes possible in the present embodiment to apply the greatest weight to the pixel signal from the pixel 10 at the center when combining signals from a plurality of pixels 10 disposed consecutively along the column direction. As a result, image data can be generated in conjunction with sum pixel signals, each generated by combining the pixel signals from the pixels around (above and below) the pixel at the center with the pixel signal from the pixel at the center.

It is to be noted that the pixel signal from the pixel 10 (1, 1) and the pixel signal from the pixel 10 (3, 1) may be read out and combined at the second vertical signal line VL2 and the pixel signal from the pixel 10 (2, 1) at the central position may be read out to the first vertical signal line VL1 in the second control mode, instead. In such a case, the arithmetic unit 51 will add together and average a combined pixel signal output on the second vertical signal line VL2 and the pixel signal from the pixel 10 at the center, output on the first vertical signal line VL1.

In addition, the pixels 10 in the embodiment described above each include two selection units, i.e., the first selection unit 16 and the second selection unit 17, so as to enable adjustment of the number of pixels arranged along the column direction to be designated as combination-target pixels, their positions and the ratio of weight applied thereto. However, provided that the number of pixels arranged along the column direction to be designated as combination-target pixels is three and that the positions of these pixels are fixed, no pixel signal will be read out from the pixel 10 (1, 1) or the pixel 10 (3, 1) to, for instance, the second vertical signal line VL2, and accordingly, a pixel structure that does not include a second selection unit 17 may be adopted for the pixel 10 (1, 1) and the pixel 10 (3, 1).

The following is an explanation of how a sum pixel signal with weight applied to the pixel signal from the pixel 10 at the central position can be obtained in contrast with a comparison example. With VfdA, VfdB and VfdC respectively representing the voltages at the FDs 14 in the pixels 10 (1, 1), 10 (2, 1) and 10 (3, 1) in FIG. 3, the voltages (output voltages) VoutA, VoutB and VoutC of the individual pixel signals from these pixels can be expressed as in (1) through (4) below.

$$VoutA = VfdA - Vth - \Delta ov \quad (1)$$

$$VoutB = VfdB - Vth - \Delta ov \quad (2)$$

$$VoutC = VfdC - Vth - \Delta ov \quad (3)$$

$$\Delta ov = \sqrt{(2 \times Id/\beta)} \quad (4)$$

Vth represents a threshold-value voltage set for the transistor M3 constituting the amplifier unit 15 in each pixel 10, whereas Id represents the current (value) flowing to the transistor M3 at the amplifier unit 15. In addition, β is a value that is determined based upon the film thickness of the gate oxide film, the gate width, the gate length and the carrier mobility.

The output voltages VoutA, VoutB and VoutC expressed as in (1) through (3) above, are the voltages of pixel signals output when pixel signals are independently and separately read out from the pixels 10 (1, 1), 10 (2, 1) and 10 (3, 1). Namely, the output voltages VoutA, VoutB and VoutC are voltages sequentially output on the first vertical signal line VL1 from the pixels 10 (1, 1), 10 (2, 1) and 10 (3, 1) in the first control mode.

In addition, a voltage Vout1 output on the first vertical signal line VL1 in the second control mode, which is the voltage of the combined pixel signal derived from the pixel 10 (1, 1) and the pixel 10 (3, 1), can be expressed as in (5) and (6) below.

$$Vout1 = (VfdA + VfdC)/2 - Vth - (\tfrac{1}{2})\sqrt{(\Delta ov^2 - \Delta Vfd2^2)} \quad (5)$$

$$\Delta Vfd2 = (VfdA - VfdC)^2 \quad (6)$$

Furthermore, a voltage Vout2 output on the second vertical line VL2 in the second control mode, which is the output voltage VoutB from the pixel 10 (2, 1) can be expressed as in (7) below.

$$Vout2 = VoutB = VfdB - Vth - \Delta ov \quad (7)$$

A voltage Vout of the sum pixel signal obtained by combining the pixel signals from the pixels 10 (1, 1), 10 (2, 1) and 10 (3, 1), i.e., a sum signal generated via the arithmetic unit 50, takes a value obtained by adding together and averaging the voltage Vout1 expressed in (5) and the voltage Vout2 expressed in (7), as expressed in (8) below.

$$Vout = \{[(VfdA + VfdC)/2 - Vth - (\tfrac{1}{2})\sqrt{(\Delta ov^2 - \Delta Vfd2^2)}] + [VfdB - Vth - \Delta ov]\}/2 \quad (8)$$

FIG. 4(a) presents a chart indicating the relationship of the output voltage Vout of the sum pixel signal to the output voltages VoutA, VoutB and VoutC. FIG. 4(b) indicates electric currents (IdA, IdB and IdC) flowing to the amplifier units 15 of the pixels 10 (1, 1), 10 (2, 1) and 10 (3, 1) in the second control mode.

In FIG. 4(a), the level of the output voltage is indicated along the vertical axis and the level of the voltage VfdB at the FD 14 in the pixel 10 (2, 1) is indicated along the horizontal axis. In addition, in FIG. 4(a), VoutA is the output voltage from the pixel 10 (1, 1) corresponding to VfdA taking a fixed value V2, and VoutC is the output voltage from the pixel 10 (3, 1) corresponding to VfdC taking a fixed value V1. VoutB is the output voltage VoutB from the pixel 10 (2, 1) corresponding to a variable VfdB.

In FIG. 4(b), the level of the electric current flowing to the amplifier units 15 of the pixel 10 is indicated along the vertical axis and the level of the voltage VfdB at the FD 14 in the pixel 10 (2, 1) is indicated along the horizontal axis. In addition, in FIG. 4(b), IdA indicates the electric current flowing to the amplifier unit 15 of the pixel 10 (1, 1) corresponding to VfdA takes the fixed value V2 and IdC indicates the electric current flowing to the amplifier unit 15 of the pixel 10 (3, 1) corresponding to VfdC takes the fixed value V1. Furthermore, IdB is the electric current flowing to the amplifier unit 15 of the pixel 10 (2, 1) corresponding to a variable VfdB.

As explained earlier, in the second control mode, the electric current from the first electric current source 25 is shunted and flows to the pixel 10 (1, 1) and the pixel 10 (3, 1) as separate electric currents in correspondence to the voltages at the FDs 14 in the pixel 10 (1, 1) and the pixel 10 (3, 1). In the example presented in FIGS. 4(*a*) and 4(*b*), VfdA is greater than VfdC, and thus, IdA is greater than IdC. In addition, the electric current from the second electric current source 26 flows in its entirety to the pixel 10 (2, 1) at the central position in the second control mode. As explained earlier, the levels of the electric currents (electric current values) provided from the first electric current source 25 and the second electric current source 26 are substantially equal to each other. For this reason, the ratio of IdA, IdB and IdC will change within the range of 1:1:0 through 0:1:1. Accordingly, since IdA or IdC can never exceed IdB, a sum pixel signal with a weight applied to the pixel 10 (2, 1) at the center can be obtained.

In contrast, pixel signals from the three pixels 10 (1, 1), 10 (2, 1) and 10 (3, 1) are combined at the first vertical signal line VL1 in the comparison example. Namely, the first selection units 16 are all set in an ON state and the second selection units 17 are all set in an OFF state in the three pixels 10. A voltage Vout of the signal generated by combining the pixel signals from the pixels 10 (1, 1), 10 (2, 1) and 10 (3, 1) in this situation can be expressed as in (9) and (10) below.

$$Vout=(VfdA+VfdB+VfdC)/3-Vth-(\tfrac{1}{3})\sqrt{(\Delta ov^2-\Delta Vfd3^2)} \qquad (9)$$

$$\Delta Vfd3=(VfdA-VfdB)^2+(VfdB-VfdC)^2+(VfdC-VfdA)^2 \qquad (10)$$

Figure 4:
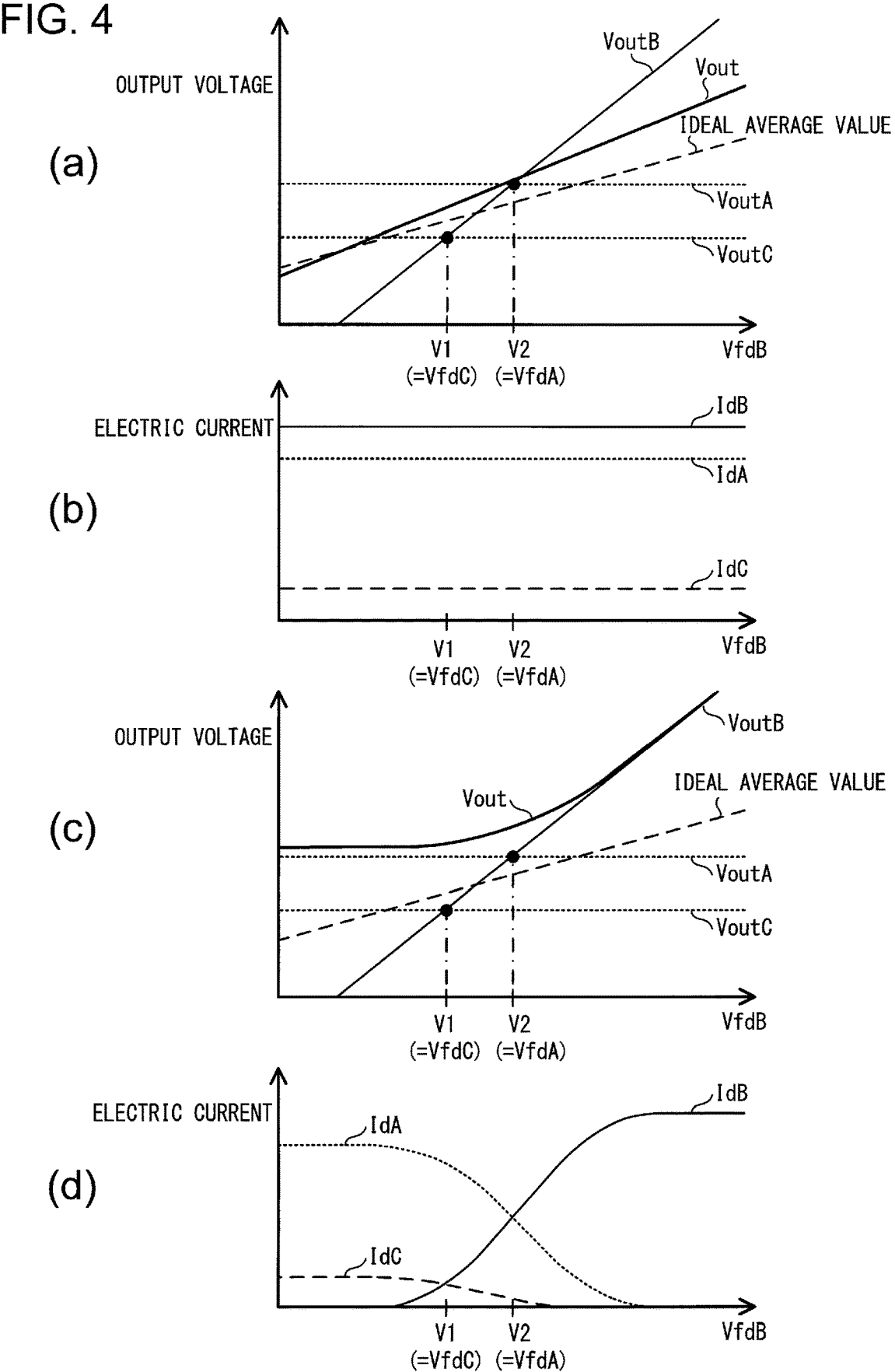

FIGS. 4(*c*) and 4(*d*) present charts indicating output voltages and electric currents in the comparison example. It is to be noted that voltages VoutA, VoutB and VoutC output when individually and separately reading out the pixel signals from the pixels 10 (1, 1), 10 (2, 1) and 10 (3, 1) are similar to those in FIG. 4(*a*). In the comparison example, much of the electric current from the first electric current source 25 will flow to the amplifier unit 15 of the pixel achieving the highest potential at its FD 14, among the three pixels 10. For this reason, IdA will assume the greatest value over the range of VfdB<V2 (=VfdA) and IdB will assume the greatest value over the range of VfdB>V2 (=VfdA), as indicated in FIG. 4(*d*). As a result, the output voltage Vout will take a value closer to VoutA over the range of VfdB<V2 (=VfdA) and will take a value closer to VoutB over the range of VfdB>V2 (=VfdA) as indicated in FIG. 4(*c*).

The ideal average values in FIGS. 4(*a*) and 4(*c*) each represent an output voltage that will be ideally achieved for a signal obtained by combining the pixel signals from the pixels 10 (1, 1), 10 (2, 1) and 10 (3, 1) and can be expressed as in (11) below.

$$\text{Ideal average value}=(VoutA+VoutB+n\ VoutC)/3=\\(VfdA+VfdB+VfdC)/3-Vth-\Delta ov \qquad (11)$$

Comparison of the output voltage Vout according to the present embodiment as indicated in FIG. 4(*a*) and the output voltage Vout in the comparison example indicated in FIG. 4(*c*) reveals that a value closer to the ideal average value is achieved through the present embodiment. In addition, the output voltage Vout in the comparison example takes a value close to VoutA over the range of VfdB<V2 (=VfdA), instead of a value with a greatest weight applied to VoutB from the pixel 10 (2, 1) at the central position. In contrast, an output voltage Vout with a weight applied to the pixel signal from the pixel 10 (2, 1) at the central position can be obtained through the present embodiment.

Figure 5:
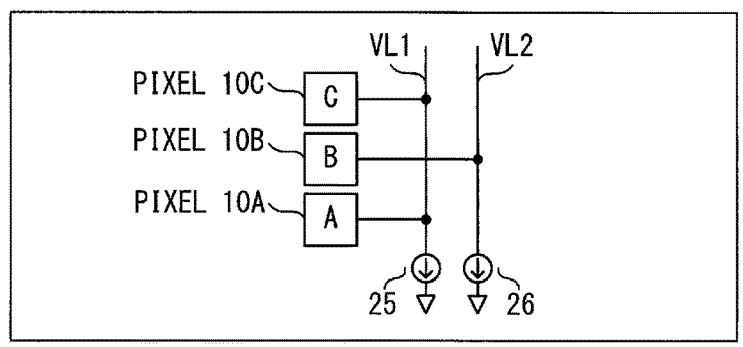
Figure 5:
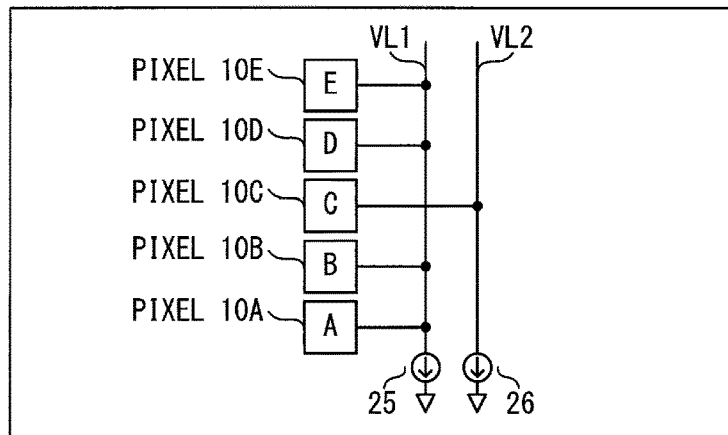
Figure 5:
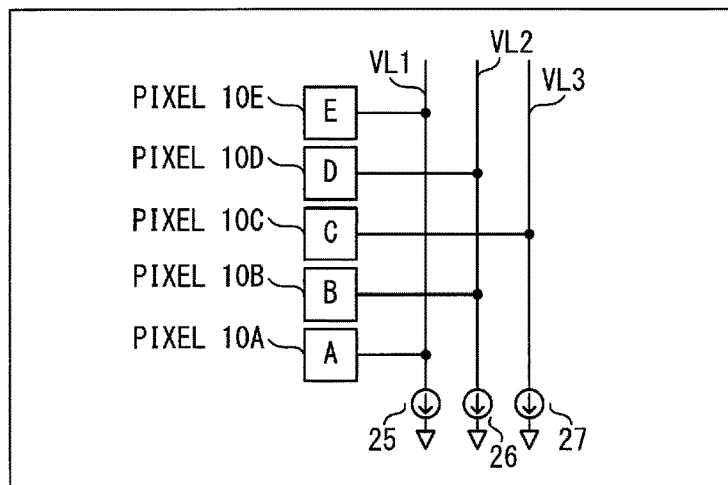
Figure 5:
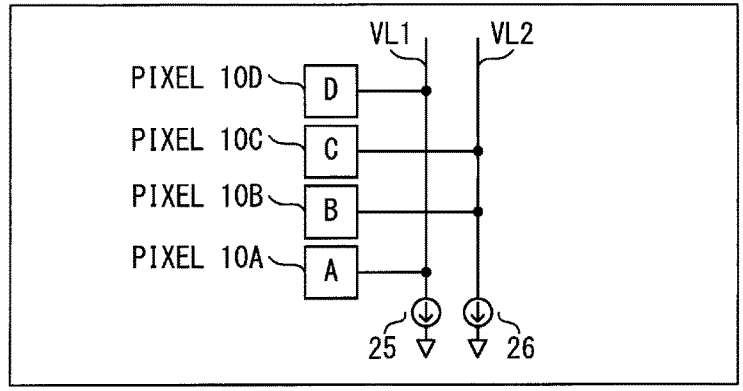

Next, examples of combination processing in which pixel signals from four or more pixels disposed consecutively along the column direction are combined will be explained. While pixel signals from three pixels 10 disposed consecutively along the column direction are combined through the combination processing in the example presented in FIG. 3, any number of pixels 10 may be designated as combination-target pixels. FIG. 5 schematically illustrates combination processing through which pixel signals from a plurality of pixels 10 arranged along the column direction are combined. FIG. 5(*a*) presents a chart schematically illustrating the relationship among three pixels 10, the pixel signals from which are combined as shown in FIG. 3, the first and second vertical signal lines VL1 and VL2 and the first and second electric current sources 25 and 26.

In FIG. 5(*a*), the pixel signals from pixels 10A and 10C located above and below the pixel at the center are read out to the first vertical signal line VL1 where they are combined and the pixel signal from the central pixel 10B is read out to the second vertical signal line VL2. The combined pixel signal read out on the first vertical signal line VL1 and the pixel signal from the pixel 10B at the central position read out to the second vertical signal line VL2 are added together and averaged at the arithmetic unit 50, as has been explained earlier.

FIGS. 5(*b*) and 5(*c*) each present a chart illustrating a pixel signal readout method that may be adopted when pixel signals from five pixels 10 disposed consecutively along the column direction are combined. In the example presented in FIG. 5(*b*), the pixel signals from pixels 10A, 10B, 10D and 10E, excluding the central pixel, are read out to the first vertical signal line VL1 where they are combined, and the pixel signal from the pixel 10B at the central position is read out to the second vertical signal line VL2. The combined pixel signal derived from the four pixels 10A, 10B, 10D and 10E, read out on the first vertical signal line VL1 and the pixel signal from the central pixel 10B read out to the second vertical signal line VL2 are added together and averaged by the arithmetic unit 50.

In the combination processing executed in this situation, the pixel signals from five pixels 10 are combined by reading out the pixel signal from the central pixel 10C alone to the second vertical signal line VL2 and reading out the pixel signals from the remaining four pixels 10A, 10B, 10D and 10E to the first vertical signal line VL1. As a result, a weight, which is greater than the weight applied to signals from the four pixels 10A, 10B, 10D and 10E by a sufficient degree, can be applied to the pixel signal from the pixel 10C at the central position.

Furthermore, by setting a greater value for the electric current generated in the second electric current source 26 than the value of the electric current generated in the first electric current source 25, an even greater weight, in comparison to the weight applied to the pixel signals from the remaining four pixels, can be applied to the pixel signal from the central pixel 10C. The same principle applies when combining pixel signals from three pixels, as shown in FIG. 5(*a*). Namely, by setting a greater value for the electric current generated in the second electric current source 26 in comparison to the value of the electric current generated in the first electric current source 25, an even greater weight can be applied to the pixel signal from the central pixel 10B.

In the example presented in FIG. 5(*c*), a third vertical signal line VL3, in addition to the first and second vertical signal lines VL1 and VL2, and a third electric current source 27 connected to the third vertical signal line VL3 are disposed in correspondence to a column of pixels disposed consecutively along the column direction. The pixel signal from the pixel 10C at the central position is read out to the third vertical signal line VL3, whereas the pixel signals from the nearby pixels 10B and 10D, located immediately above and below the central pixel 10C are read out to the second vertical signal line VL2 where they are combined. The pixel signals from the peripheral pixels 10A and 10E respectively adjacent to the pixel 10B and the pixel 10D located immediately above and below the central pixel are read out to the first vertical signal line VL1 where they are combined. The arithmetic unit 50 generates a sum pixel signal by adding together and averaging the combined pixel signal on the first vertical signal line VL1, the combined pixel signal on the second vertical signal line VL2 and the pixel signal from the central pixel 10C on the third vertical signal line VL3.

As described above, the pixel signal from the pixel 10C at the central position alone is read out to the third vertical signal line VL3, the pixel signals from the nearby pixels 10B and 10D are read out and combined on the second vertical signal line VL2 and the pixel signals from the peripheral pixels 10A and 10E are read out and combined on the first vertical signal line VL1. As a result, a greater weight, in comparison to the weight applied to the pixel signals from the other four pixels 10A, 10B, 10D and 10E, can be applied to the pixel signal from the pixel 10C at the central position.

In the example presented in FIG. 5(c), a greater value may be set for the electric current generated in the second electric current source 26 in comparison to the value of the electric current generated in the first electric current source 25. In such a case, a greater weight, in comparison to the weight applied to the pixel signals from the two peripheral pixels 10A and 10E, can be applied to the pixel signals from the two nearby pixels 10B and 10D. It is desirable that the electric current generated in the third electric current source 27 in this situation achieve a value equal to or greater than the value of the electric current generated in the second electric current source 26.

FIG. 5(b) presents a chart illustrating a pixel signal readout method that may be adopted when combining pixel signals from four pixels 10 disposed consecutively along the column direction. The value of the electric current generated in the second electric current source 26 is set greater than the value of the electric current generated in the first electric current source 25. The pixel signals from the two central pixels 10B and 10C are read out to the second vertical signal line VL2 where they are combined, and the pixel signals from the pixels 10A and 10D respectively located immediately above and below the two central pixels 10B and 10C, are read out to the first vertical signal line VL1 where they are combined. Then, the arithmetic unit 50 generates a sum pixel signal by adding together and averaging the combined pixel signal derived from the pixels 10B and 10C and the combined pixel signal derived from the pixels 10A and 10D. Since the electric current generated in the second electric current source 26 takes a value greater than the value of the electric current generated in the first electric current source 25 as described earlier, a greater weight, compared to the weight applied to the pixel signals from the pixels 10A and 10D at the top and the bottom, can be applied to the pixel signals from the two central pixels 10B and 10C.

The following advantageous effects can be achieved through the embodiment described above.

(1) The image sensor 3 includes a plurality of pixels 10, each having a photoelectric conversion unit 11 that generates an electric charge through photoelectric conversion of incident light, which are arranged along a first direction, a first signal line (first vertical signal line VL1) where signals output thereto from multiple pixels 10 among the plurality of pixels 10, are combined, a second signal line (second vertical signal line VL2) to which a signal from another pixel(s) 10 among the plurality of pixels 10 is output, and an arithmetic unit 50 that executes an arithmetic operation by using the signals output to the first signal line and the signal output to the second signal line. This structure makes it possible to obtain a signal achieving a value close to the average of a plurality of pixel signals when the signal is read out by combining pixel signals from a plurality of pixels. In addition, it is possible to prevent that when combining a plurality of pixel signals, a weight is applied to the pixel signal from a pixel with the FD thereof achieving a high potential irrespective of the position of the pixel. As a result, it is possible to ensure that the quality of pixel signals is not compromised.

(2) The "another" pixel(s) 10 may be a first pixel (the pixel 10 (2, 1) in FIG. 3) and "multiple" pixels 10 among the plurality of pixels 10 include a second pixel and a third pixel (the pixel 10 (1, 1), and the pixel 10 (3, 1) in FIG. 3) disposed on the two opposite sides of the first pixel. Thus, a signal with a weight applied to the pixel signal from the central pixel can be obtained by combining pixel signals from a plurality of pixels. This, in turn, makes it possible to generate image data based upon pixel signals each generated by incorporating the pixel signals from the pixels located around (above and below) the pixel located at the central position with the pixel signal from the central pixel. As a result, weight will be applied to pixels located at consistent positions, which makes it possible to prevent the quality of an image generated by using the pixel signals from becoming poor.

Second Embodiment

In reference to drawings, the image-capturing device and the image sensor according to the second embodiment will be described. An image sensor 3 according to the second embodiment separately and individually reads out pixel signals from all the pixels 10, as in the first embodiment, when the first control mode is set by the control unit 4. However, if the second control mode is set by the control unit 4, the image sensor 3 according to the second embodiment reads out a signal by combining signals from a plurality of pixels 10 disposed consecutively along the row direction and along the column direction. For instance, the image sensor 3 may read out a signal by combining signals from three×three=nine pixels. In the example presented in FIG. 6, the image sensor 3 combines signals from pixels 10 (1, 1) through 10 (3, 3) and outputs a combined pixel signal to the control unit 4. At the image sensor 3, the pixel signal readout from the individual pixels 10 is controlled so as to obtain a pixel signal with a greatest weight applied to the pixel signal from the pixel at the central position when generating a pixel signal by combining signals from a plurality of pixels 10 disposed consecutively along the row direction and along the column direction.

Figure 6:
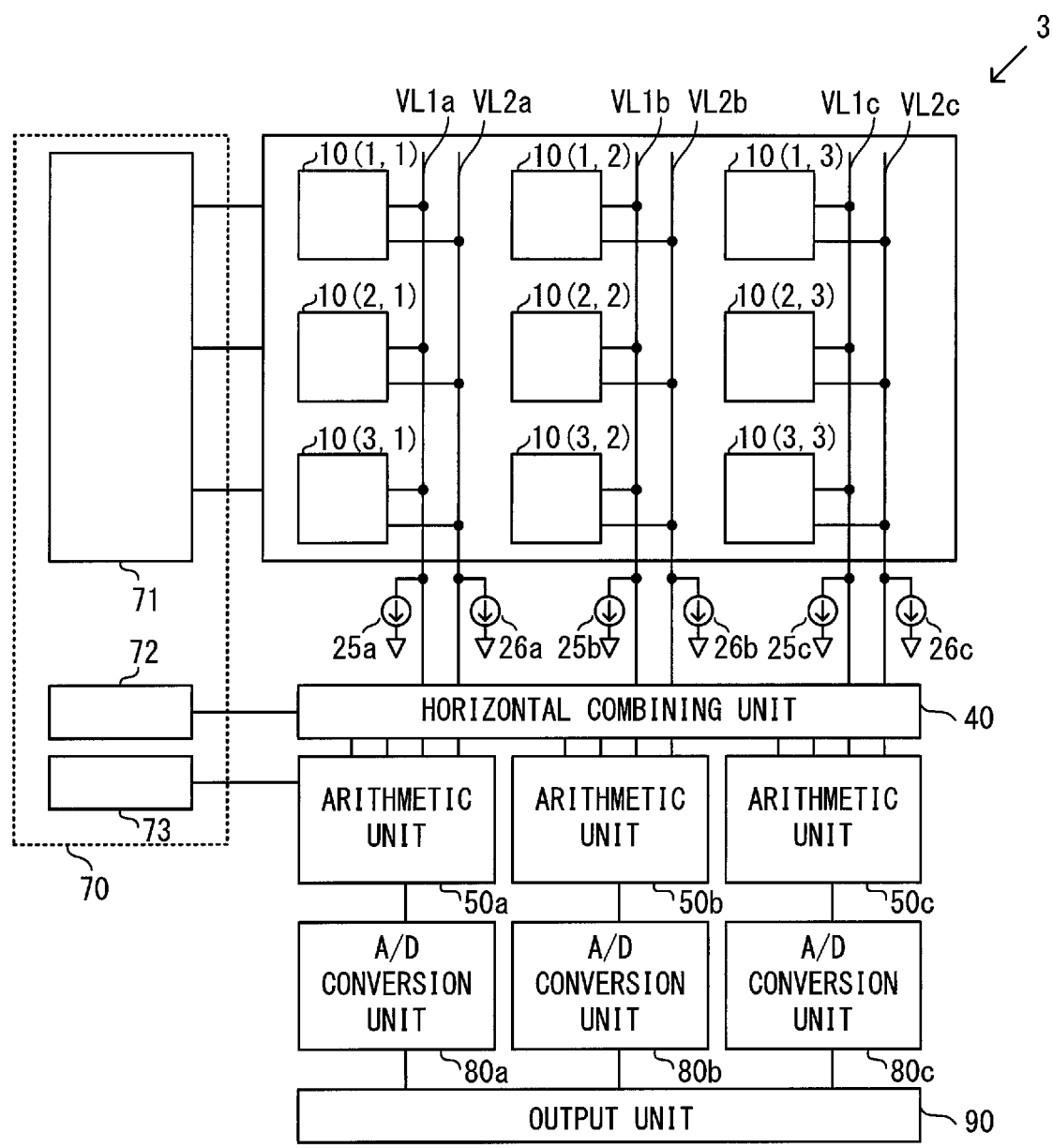

FIG. 6 is a block diagram illustrating part of the structure adopted in the image sensor 3 according to the second embodiment. The image sensor 3 includes a plurality of pixels 10 (pixels arranged over three rows× three columns), first and second vertical signal lines VL1 (VL1a through VL1c) and VL2 (VL2a through VL2c), each disposed in correspondence to one of the pixel columns, first electric current sources 25 (25a through 25c) disposed in correspondence to the first vertical signal lines VL1, second electric current sources 26 (26a through 26c) disposed in correspondence to the second vertical signal lines VL2, a horizontal combining unit 40, arithmetic units 50 (50a through 50c), A/D conversion units 80 (80a through 80c), an output unit 90 and a vertical control unit 70.

The arithmetic units 50 (50a through 50c) are each disposed in correspondence to a first vertical signal line VL1 (among VL1a through VL1c) and a second vertical signal line VL2 (among VL2a through VL2c). The arithmetic units 50a through 50c each execute an arithmetic operation to add together pixel signals from a plurality of pixels disposed consecutively along the column direction, as does the arithmetic unit 50 shown in FIG. 3. The arithmetic unit 50b also adds together the pixel signals from the nine pixels arranged over three rows× three columns, as will be explained later, in addition to adding together the pixel signals from the plurality of pixels disposed consecutively along the column direction, as described above. In addition, the A/D conversion units (80a through 80c) are each disposed in correspondence to one of the arithmetic units 50 (50a through 50c). The output unit 90 is disposed as a common unit shared among the plurality of A/D conversion units 80. It is to be noted that FIG. 6 shows nine pixels 10, i.e., pixels 10 (1, 1) through 10 (3, 3), with the pixel 10 arranged at the upper left corner designated as the first row/first column pixel 10 (1, 1) and the pixel 10 arranged at the lower right corner designated as the third row/third column pixel 10 (3, 3).

As will be described later, the horizontal combining unit 40 is constituted with a plurality of switches and combines pixel signals output on the first vertical signal lines VL1 and the second vertical signal lines VL2. The arithmetic units 50 each execute an arithmetic operation to add together signals input thereto via the horizontal combining unit 40. The A/D conversion units 80 convert signals output thereto from the arithmetic units 50 to digital signals and output the digital signals resulting from the conversion to the output unit 90. The output unit 90, which includes a signal processing unit (not shown), executes signal processing including correlated double sampling and signal level correction processing on the signals input thereto from the A/D conversion units 80 and outputs a signal resulting from the signal processing to the control unit 4 of the electronic camera.

The vertical control unit 70 includes a vertical combination control unit 71, a horizontal combination control unit 72 and an addition control unit 73. The vertical combination control unit 71 executes ON/OFF control of the first selection unit 16 (see FIG. 3) and the second selection unit 17 (see FIG. 3) in each pixel 10 so as to control combination processing executed to combine pixel signals from the plurality of pixels disposed consecutively along the column direction (vertical direction). The horizontal combination control unit 72 executes ON/OFF control of the plurality of switches constituting the horizontal combining unit 40 so as to control combination processing executed to combine pixel signals from the plurality of pixels disposed consecutively along the row direction (horizontal direction). The addition control unit 73 switches capacitors to be connected individually to the first vertical signal lines VL1 and the second vertical signal lines VL2 and to the arithmetic units 50 by controlling the ON/OFF states of a plurality of switches in the arithmetic units 50.

Figure 7:
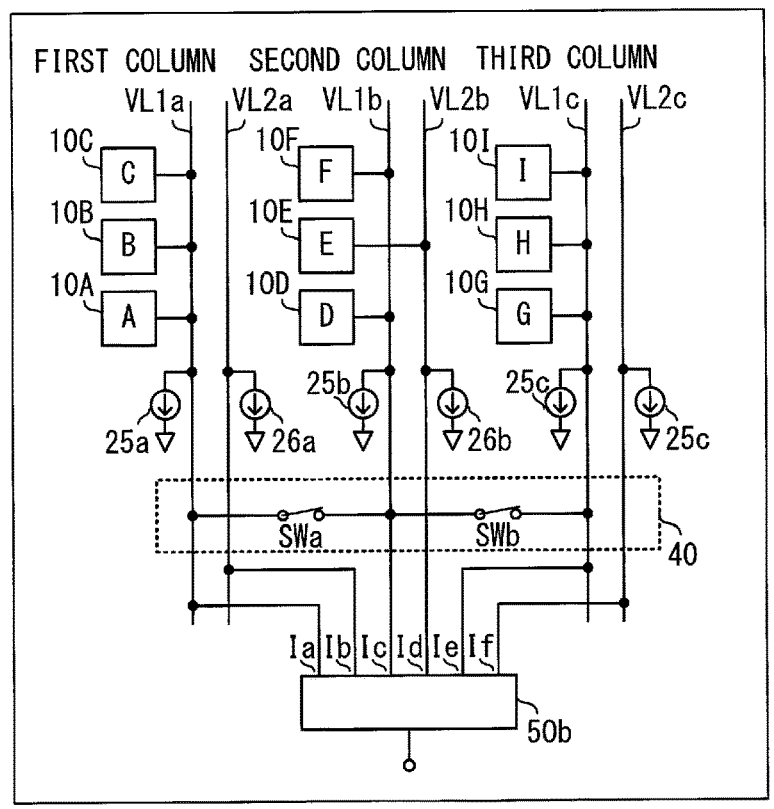
Figure 7:
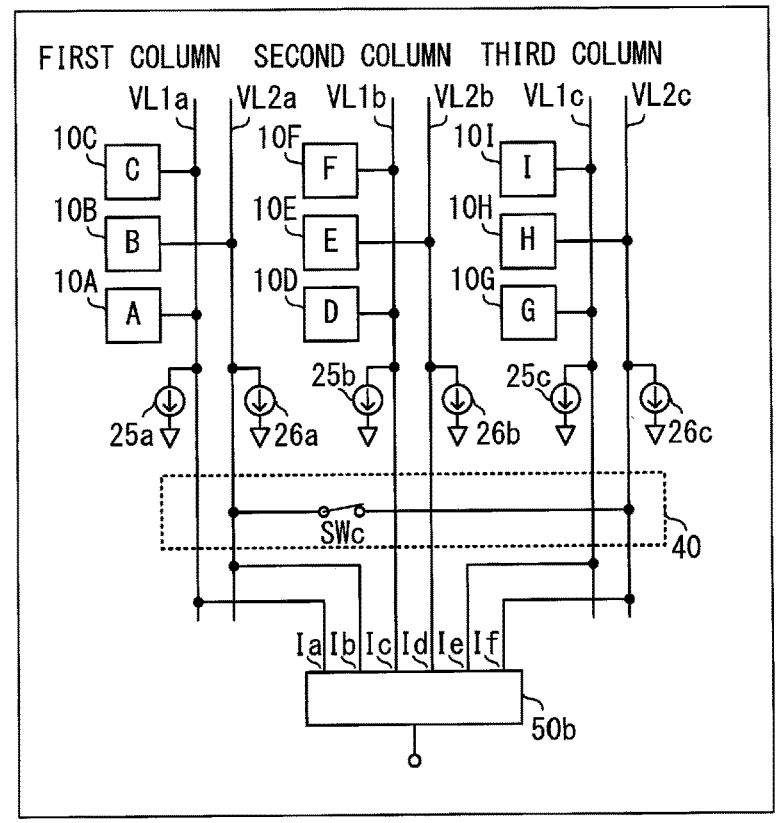

FIG. 7(a) presents charts each schematically illustrating an example of combination processing may be executed to combine pixel signals from the nine pixels arranged over three rows× three columns in the image sensor 3 according to the second embodiment. It is to be noted that only three× three=nine pixels 10 and the arithmetic unit 50b among the arithmetic units 50 are shown in relation to the example presented in FIG. 7(a) and also in relation to the example presented in FIG. 7(b), which will be explained later, so as to simplify the explanation. The horizontal combining unit 40 in the example presented in FIG. 7(a) includes a switch SWa that connects/disconnects the first vertical signal line VL1a with/from the first vertical signal line VL1b and a switch SWb that connects/disconnects the first vertical signal line VL1b with/from the first vertical signal line VL1c.

The arithmetic unit 50b includes a first input unit Ia through a sixth input unit If. The first input unit Ia is connected to the first vertical signal line VL1a, and the second input unit Ib is connected to the second vertical signal line VL2a. The third input unit Ic is connected to the first vertical signal line VL1b, the fourth input unit Id is connected to the second vertical signal line VL2b, the fifth input unit Ie is connected to the first vertical signal line VL1c, and the sixth input unit If is connected to the second vertical signal line VL2c.

The vertical control unit 70 (see FIG. 6) sets both the switch SWa and the switch SWb in the horizontal combining unit 40 in an ON state. In addition, the vertical control unit 70 reads out a pixel signal from a pixel 10E at the central position among the three× three=nine pixels, to the second vertical signal line VL2b. The vertical control unit 70 also reads out pixel signals from the eight pixels, i.e., pixels 10A through 10D and pixels 10F through 10I, located around the central pixel 10E, to the first vertical signal lines VL1. To describe this in more specific detail, the vertical control unit 70 reads out the pixel signals from the pixels 10A, 10B and 10C in the first column to the first vertical signal line VL1a, reads out the pixel signals from the pixels 10D and 10F in the second column to the first vertical signal line VL1b and reads out the pixel signals from the pixels 10G, 10H and 10I in the third column to the first vertical signal line VL1c. As a result, the pixel signals from the pixels 10A, 10B and 10C in the first column are combined and a combined pixel signal is generated on the first vertical signal line VL1a, whereas the pixel signals from the pixels 10D and 10F in the second column are combined and a combined pixel signal is generated on the first vertical signal line VL1b. Likewise, the pixel signals from the pixels 10G, 10H and 10I in the third column are combined and a combined pixel signal is generated on the first vertical signal line VL1c.

In addition, since both the switch SWa and the switch SWb are set in an ON state, the first vertical signal line VL1a, the first vertical signal line VL1b and the first vertical signal line VL1c become electrically connected with one another. As a result, the combined pixel signals output on the first vertical signal line VL1a, the first vertical signal line VL1b and the first vertical signal line VL1c become further combined with one another. Namely, the combined pixel signal derived from the pixels 10A, 10B and 10C in the first column, the combined pixel signal derived from the pixels 10D and 10F in the second column and the combined pixel signals derived from the pixels 10G 10H and 10I in the third column are combined. Thus, a combined pixel signal derived from the eight pixels 10A through 10D and 10F through 10I is input to the first input terminal Ia, the third input terminal Ic and the fifth input terminal Ie of the arithmetic unit 50b and the pixel signal from the central pixel 10E is input to a fourth input terminal Id of the arithmetic unit 50b.

The arithmetic unit 50b outputs a sum pixel signal generated by adding together and averaging the combined pixel signal derived from the eight pixels located at positions other than the central pixel position and the pixel signal from the central pixel 10E. Through this process, a pixel signal with a weight applied to the pixel signal from the central pixel can be obtained by combining the individual pixel signals from the three× three=nine pixels.

FIG. 7(b) presents a chart schematically illustrating another example of pixel signal combination processing that may be executed in the image sensor 3 according to the second embodiment. The horizontal combining unit 40 in the example presented in FIG. 7(b) includes a switch SWc that connects/disconnects the second vertical signal line VL2a with/from the second vertical signal line VL2c. The vertical control unit 70 sets the switch SWc in the horizontal combining unit 40 in an ON state. The vertical control unit 70 reads out the pixel signal from the central pixel 10E among the pixels 10 in the second column (the pixels 10D, 10E and 10F) to the second vertical signal line VL2b and reads out the pixel signals from the pixels 10D and 10F to the first vertical signal line VL1b. Thus, the pixel signal from the pixel 10D and the pixel signal from the pixel 10F are combined and a combined pixel signal is generated on the first vertical signal line VL1b.

The vertical control unit 70 reads out the pixel signal from the central pixel 10B among the pixels 10 in the first column (the pixels 10A, 10B and 10C) to the second vertical signal line VL2a and reads out the pixel signals from the pixels 10A and 10C to the first vertical signal line VL1a. Thus, the pixel signal from the pixel 10A and the pixel signal from the pixel 10C are combined and a combined pixel signal is generated on the first vertical signal line VL1a. Likewise, the vertical control unit 70 reads out the pixel signal from the central pixel 10H among the pixels 10 in the third column (the pixels 10G, 10H and 10I) to the second vertical signal line VL2c and reads out the pixel signals from the pixels 10G and 10I to the first vertical signal line VL1c. As a result, the pixel signal from the pixel 10G and the pixel signal from the pixel 10I are combined and a combined pixel signal is generated on the first vertical signal line VL1c.

In addition, since the switch SWc is set in an ON state, the second vertical signal line VL2a and the second vertical signal line VL2c are electrically connected with each other. In this situation, the vertical control unit 70 stops the electric current supply from either the second electric current source 26a connected to the second vertical signal line VL2a or the second electric current source 26c connected to the second vertical signal line VL2c. For instance, the vertical control unit 70 may stop the electric current supply from the second electric current source 26c. In this case, the electric current from the second electric current source 26a will be provided to the pixel 10B via the second vertical signal line VL2a and also will be provided to the pixel 10H via the second vertical signal line VL2a, the switch SWc and the second vertical signal line VL2c. On the second vertical signal line VL2a and the second vertical signal line VL2c, the pixel signal from the pixel 10B and the pixel signal from the pixel 10H are combined and a combined pixel signal is generated.

The arithmetic unit 50b outputs a sum pixel signal generated by adding together and averaging the combined pixel signal derived from the pixel 10A and the pixel 10C, the combined pixel signal derived from the pixel 10D and the pixel 10F, the combined pixel signal derived from the pixel 10G and the pixel 10I and the combined pixel signal derived from the pixel 10B and the pixel 10H, and the pixel signal from the central pixel 10E. Through this process, a pixel signal with a weight applied to the pixel signal from the central pixel can be obtained by combining the individual pixel signals from the three× three=nine pixels.

Figure 8:
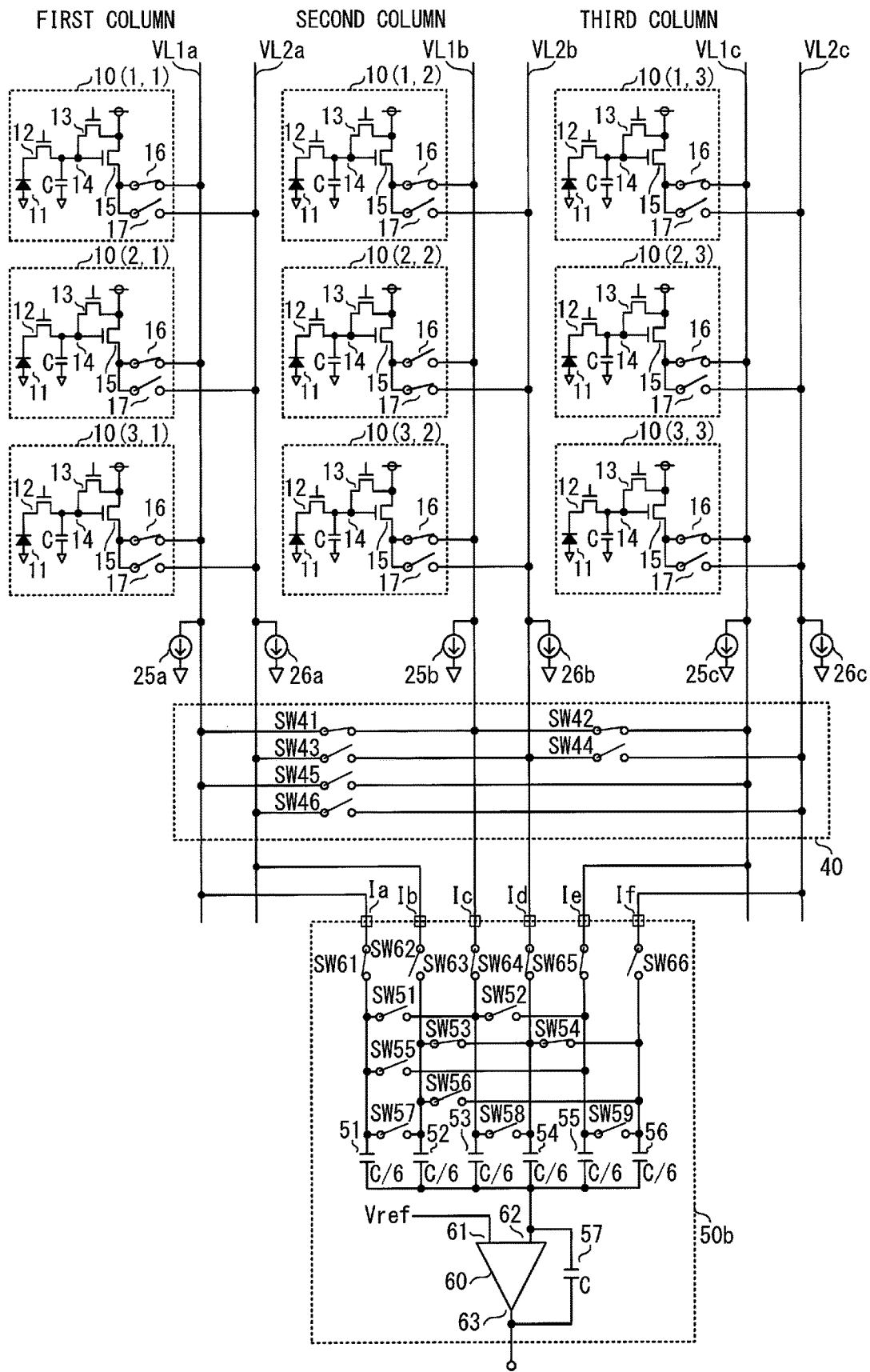

FIG. 8 is a diagram explaining a circuit structure adopted in the image sensor 3 and an example of an operation that may be execute in the image sensor 3 according to the second embodiment will be described. In reference to FIG. 8, the pixel signal combination processing executed in the image sensor 3 in FIG. 7(a) will be explained in further detail. The pixel 10 (2, 2), located at the central position among the nine pixels 10 designated as the combination-targets, corresponds to the pixel 10E in FIGS. 7(a) and 7(b). It is to be noted that the pixels 10 each adopt a circuit structure similar to that explained in reference to the first embodiment.

The horizontal combining unit 40 includes switches SW41, SW42, SW43, SW44, SW45 and SW46. The switch SW41 connects/disconnects the first vertical signal line VL1a with/from the first vertical signal line VL1b, and the switch SW42 connects/disconnects the first signal line VL1b with/from the first vertical signal line VL1c. The switch SW43 connects/disconnects the second vertical signal line VL2a with/from the second vertical signal line VL2b, and the switch SW44 connects/disconnects the second signal line VL2b with/from the second vertical signal line VL2c. The switch SW45 connects/disconnects the first vertical signal line VL1a with/from the first vertical signal line VL1c, and the switch SW46 connects/disconnects the second signal line VL2a with/from the second vertical signal line VL2c. The switches SW41 and SW42 correspond to the switches SWa and SWb in FIG. 7(a) respectively and the switch SW46 corresponds to the switch SWc in FIG. 7(b).

The arithmetic unit 50b includes the first input unit Ia through sixth input unit If, capacitors 51 through 57, switches SW51 through SW59 and switches SW61 through SW66. One terminal of the capacitor 51 is connected to the first vertical signal line VL1a via the switch SW61 and another terminal of the capacitor 51 is connected to an input terminal 62 of an amplification unit 60. One terminal of the capacitor 52 is connected to the second vertical signal line VL2a via the switch SW62 and another terminal of the capacitor 52 is connected to the input terminal 62. One terminal of the capacitor 53 is connected to the first vertical signal line VL1b via the switch SW63 and another terminal of the capacitor 53 is connected to the input terminal 62, whereas one terminal of the capacitor 54 is connected to the second vertical signal line VL2b via the switch SW64 and another terminal of the capacitor 54 is connected to the input terminal 62. One terminal of the capacitor 55 is connected to the first vertical signal line VL1c via the switch SW65 and another terminal of the capacitor 55 is connected to the input terminal 62, whereas one terminal of the capacitor 56 is connected to the second vertical signal line VL2c via the switch SW66 and another terminal of the capacitor 56 is connected to the input terminal 62. In addition, one terminal of the capacitor 57 is connected to the input terminal 62 of the amplification unit 60 and another terminal of the capacitor 57 is connected to an output terminal 63 of the amplification unit 60. The capacitance at the capacitor 53 takes a capacitance value C, whereas the capacitances at the capacitors 51 through 56 all assume a capacitance value which is ⅙ of the capacitance value C, i.e., a capacitance value ⅙ C. It is to be noted that the capacitors 51 through 57 may be each constituted with a variable capacitor having a variable capacitance value.

The switch SW51 connects/disconnects the one terminal of the capacitor 51 with/from one terminal of the capacitor 53 and the switch SW52 connects/disconnects the one terminal of the capacitor 53 with/from one terminal of the capacitor 55. The switch SW53 connects/disconnects the one terminal of the capacitor 52 with/from the one terminal of the capacitor 54 and the switch SW54 connects/disconnects the one terminal of the capacitor 54 with/from one terminal of the capacitor 56. In addition, the switch SW55 connects/disconnects the one terminal of the capacitor 51 with/from the one terminal of the capacitor 55 and the switch SW56 connects/disconnects the one terminal of the capacitor 52 with/from the one terminal of the capacitor 56. Furthermore, the switch SW57 connects/disconnects the one terminal of the capacitor 51 with/from the one terminal of the capacitor 52 and the switch SW58 connects/disconnects the one terminal of the capacitor 53 with/from the one terminal of the capacitor 54. The switch SW59 connects/disconnects the one terminal of the capacitor 55 with/from the one terminal of the capacitor 56.

The arithmetic unit 50b outputs, through the output terminal 63, a signal generated by adding together signals input to the individual capacitors 51 through 56. The signal output from the arithmetic unit 50b first undergoes signal processing via an A/D conversion unit 80, the output unit 90 and the like and is then output to the control unit 4 of the camera 1. The following is a more detailed description of the pixel signal readout method adopted in the second control mode.

The vertical combination control unit 71 (see FIG. 6) sets the first selection units 16 in an ON state and the second selection units 17 in an OFF state at the pixels 10 (1, 1), 10 (2, 1), 10 (3, 1), 10 (1,2), 10 (3, 2), 10 (1, 3), 10 (2, 3) and 10 (3, 3) located around the central position. In addition, the vertical combination control unit 71 sets the first selection unit 16 in an OFF state and the second selection unit 17 in an ON state at the pixel 10 (2, 2) located at the central position. The horizontal combination control unit 72 (see FIG. 6) sets both the switch SW41 and the switch SW42 in an ON state and sets the switches SW43 through SW46 in an OFF state at the horizontal combining unit 40. The addition control unit 73 (see FIG. 6) sets both the switch SW53 and the switch SW54 in an ON state and sets the switches SW51 through SW52 and the switches SW55 through SW59 all in an OFF state at the arithmetic unit 50b. In addition, the addition control unit 73 sets the switches SW61, SW63, SW64 and SW65 in an ON state and sets the switches SW62 and SW66 in an OFF state at the arithmetic unit 50b. Furthermore, the vertical control unit 70 stops the electric current supply from the second electric current source 26a and the electric current supply from the second electric current source 26c.

As the first selection units 16 at the pixel 10 (1, 1), the pixel 10 (2, 1) and the pixel 10 (3, 1) in the first column enter an ON state, the source terminals of the amplifier units 15 in these three pixels 10 become electrically connected to the first vertical signal line VL1a. The electric current from the first electric current source 25a connected to the first vertical signal line VL1a is shunted and distributed to the pixel 10 (1, 1), the pixel 10 (2, 1) and the pixel 10 (3, 1). On the first vertical signal line VL1a, the pixel signals from the pixel 10 (1, 1), the pixel 10 (2, 1) and the pixel 10 (3, 1) are combined and a combined pixel signal is generated.

As the first selection units 16 at the pixel 10 (1, 2) and the pixel 10 (3, 2) in the second column enter an ON state, the source terminals of amplifier units 15 in these two pixels 10 become electrically connected to the first vertical signal line VL1b. The electric current from the first electric current source 25b connected to the first vertical signal line VL1b is shunted and distributed to the pixel 10 (1, 2) and the pixel 10 (3, 2). On the first vertical signal line VL1b, the pixel signals from the pixel 10 (1, 2) and the pixel 10 (3, 2) are combined and a combined pixel signal is generated.

As the first selection units 16 at the pixel 10 (1, 3), the pixel 10 (2, 3) and the pixel 10 (3, 3) in the third column enter an ON state, the source terminals of the amplifier units 15 in these three pixels 10 become electrically connected to the first vertical signal line VL1c. The electric current from the first electric current source 25c connected to the first vertical signal line VL1c is shunted and distributed to the pixel 10 (1, 3), the pixel 10 (2, 3) and the pixel 10 (3, 3) On the first vertical signal line VL1c, the pixel signals from the pixel 10 (1, 3), the pixel 10 (2, 3) and the pixel 10 (3, 3) are combined and a combined pixel signal is generated.

In addition, as the switch SW41 and the switch SW42 both enter an ON state, the first vertical signal line VL1a, the first vertical signal line VL1b and the first vertical signal line VL1c become electrically connected with one another. As a result, the pixel signals individually output on the first vertical signal line VL1a, the first vertical signal line VL1b and the first vertical signal line VL1c become combined. Namely, the combined pixel signal derived from the pixels 10 (1, 1), 10 (2, 1) and 10 (3, 1) in the first column, the combined pixel signal derived from the pixels 10 (1, 2) and 10 (3, 2) in the second column and the combined pixel signal derived from the pixels 10 (1, 3), 10 (2, 3) and 10 (3, 3) in the third column are combined. Consequently, a combined pixel signal generated by combining the pixel signals from the eight pixels 10 (1, 1), 10 (2, 1), 10 (3, 1), 10 (1, 2), 10 (3, 2), 10 (1, 3), 10 (2, 3) and 10 (3, 3) located around the central position, is output on the first vertical signal lines VL1a, VL1b and VL1c.

As the second selection unit 17 of the central pixel 10 (2, 2) enters an ON state, the amplifier unit 15 of the pixel 10 (2, 2) becomes electrically connected to the second vertical signal line VL2b. The electric current from the second electric current source 26b connected to the second vertical signal line VL2b flows in its entirety, to the pixel 10 (2, 2). The pixel signal from the pixel 10 (2, 2) is output on the second vertical signal line VL2b.

In addition, as the switch SW53 and the switch SW54 both enter an ON state, the pixel signal from the pixel 10 (2, 2) output on the second vertical signal line VL2b is input to the capacitor 52, the capacitor 54 and the capacitor 56. The combined pixel signal derived from the eight pixels is input to the capacitor 51, the capacitor 53 and the capacitor 55. Thus, the arithmetic unit 50b outputs, through the output terminal 63 of the amplification unit 60, a sum pixel signal generated by adding together and averaging the pixel signal from the pixel 10 (2, 2) located at the central position and the combined pixel signal derived from the eight pixels other than the central pixel. Through this process, a pixel signal with a weight applied to the pixel signal from the central pixel 10 can be obtained by combining signals from a plurality of pixels 10 disposed consecutively along the column direction and along the row direction in the present embodiment.

Figure 9:
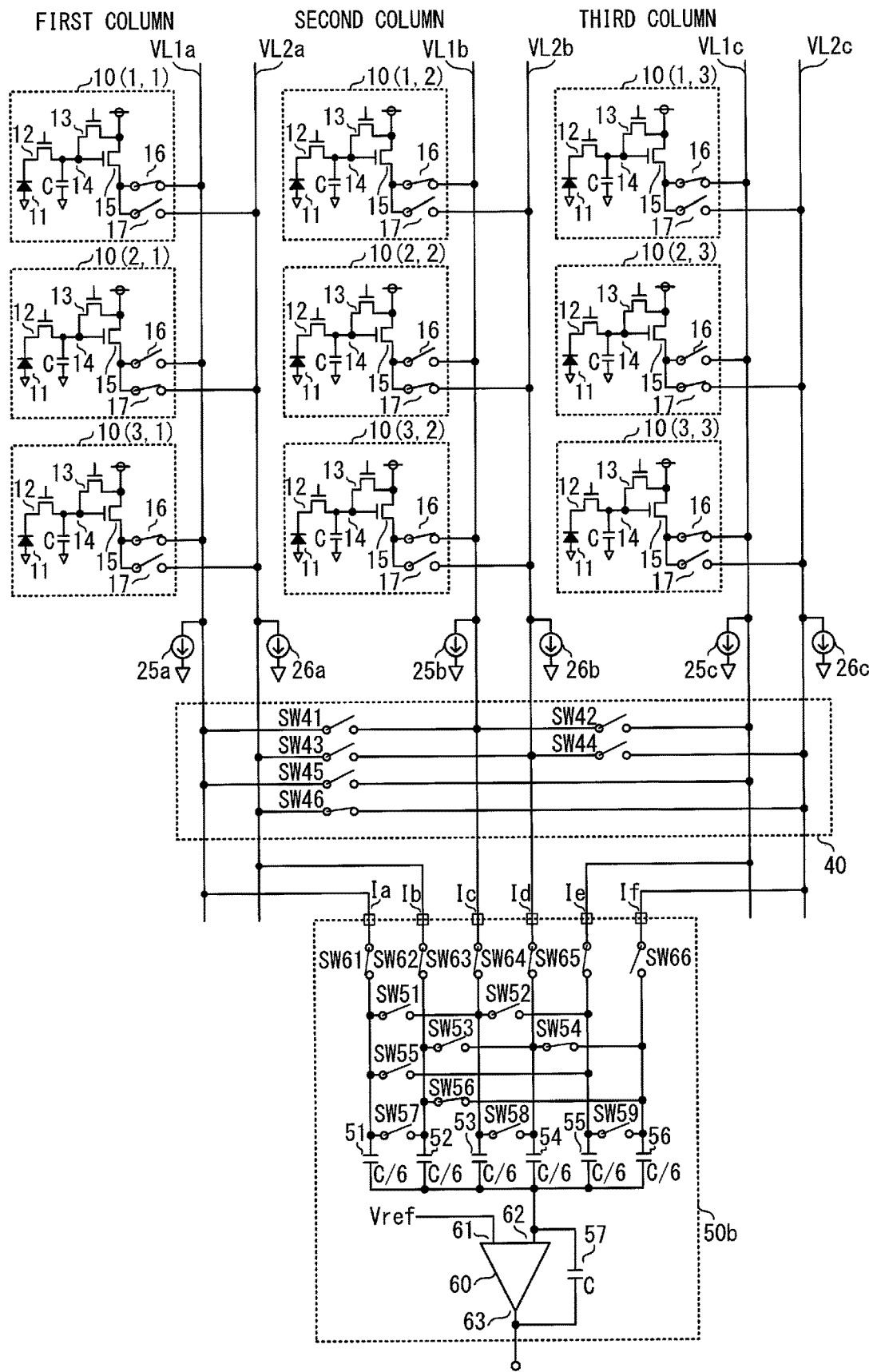

FIG. 9 presents a diagram explaining a circuit structure adopted in the image sensor 3 and another example of an operation that may be executed in the image sensor 3 according to the second embodiment will be explained. In reference to FIG. 9, the pixel signal combination processing executed in the image sensor 3 in FIG. 7(b) will be described in further detail.

The vertical combination control unit 71 sets the first selection unit 16 in an OFF state and sets the second selection unit 17 in an ON state at the central pixel 10 (2, 1) among the pixels in the first column. In addition, the vertical combination control unit 71 sets the first selection units 16 in an ON state and the second selection units 17 in an OFF state at the pixels 10 (1, 1) and 10 (3, 1) located above and below the pixel 10 (2, 1).

The vertical combination control unit 71 sets the first selection unit 16 in an OFF state and sets the second selection unit 17 in an ON state at the central pixel 10 (2, 2) among the pixels in the second column. In addition, the vertical combination control unit 71 sets the first selection units 16 in an ON state and the second selection units 17 in an OFF state at the pixels 10 (1, 2) and 10 (3, 2). Likewise, the vertical combination control unit 71 sets the first selection unit 16 in an OFF state and sets the second selection unit 17 in an ON state at the central pixel 10 (2, 3) among the pixels in the third column. In addition, the vertical combination control unit 71 sets the first selection units 16 in an ON state and the second selection units 17 in an OFF state at the pixels 10 (1, 3) and 10 (3, 3).

The horizontal combination control unit 72 sets the switch SW46 in an ON state and sets the switches SW41 through SW45 in an OFF state at the horizontal combining unit 40. The addition control unit 73 sets the switches SW54 and SW56 in an ON state and sets the switches SW51 through SW53, the switch SW55 and the switches SW57 through SW59 in an OFF state at the arithmetic unit 50b. In addition, the addition control unit 73 sets the switches SW61 through SW65 in an ON state and sets the switch SW66 in an OFF state at the arithmetic unit 50b. The vertical control unit 70 stops the electric current supply from the second electric current source 26c.

As the first selection units 16 in the pixel 10 (1, 1) and the pixel 10 (3, 1) in the first column enter an ON state, the pixel signals from the pixel 10 (1, 1) and the pixel 10 (3, 1) are combined and a combined pixel signal is generated on the first vertical signal line VL1a. In addition, as the first selection units 16 in the pixel 10 (1, 2) and the pixel 10 (3, 2) in the second column enter an ON state, the pixel signals from the pixel 10 (1, 2) and the pixel 10 (3, 2) are combined and a combined pixel signal is generated on the first vertical signal line VL1b. Likewise, as the first selection units 16 in the pixel 10 (1, 3) and the pixel 10 (3, 3) in the third column enter an ON state, the pixel signals from the pixel 10 (1, 3) and the pixel 10 (3, 3) are combined and a combined pixel signal is generated on the first vertical signal line VL1c.

Furthermore, as the second selection unit 17 in the pixel 10 (2, 1) in the first column, the second selection unit 17 in the pixel 10 (2, 3) in the third column and the switch SW46 enter an ON state, the source terminals of the amplifier units 15 in the pixel 10 (2, 1) and the pixel 10 (2, 3) become electrically connected. The electric current from the second electric current source 26a connected to the second vertical signal line VL2a is shunted and distributed to the pixel 10 (2, 1) and the pixel 10 (2, 3). A combined pixel signal generated by combining the pixel signals from the two pixels 10 (2, 1) and 10 (2, 3) is output on the second vertical signal line VL2a and the second vertical signal line VL2c.

As the second selection unit 17 in the pixel 10 (2, 2) at the central position set in an ON state, the amplifier unit 15 of the pixel 10 (2, 2) becomes electrically connected to the second vertical signal line VL2b. The electric current from the second electric current source 26b in its entirety flows to the pixel 10 (2, 2). The pixel signal from the pixel 10 (2, 2) is output on the second vertical signal line VL2b.

In addition, as the switch SW54 enters an ON state, the pixel signal from the pixel 10 (2, 2) having been output on the second vertical signal line VL2b is input to the capacitor 54 and the capacitor 56. The combined pixel signal derived from the pixel 10 (1, 1) and the pixel 10 (3, 1) having been output on the first vertical signal line VL1a is input to the capacitor 51. The combined pixel signal derived from the pixel 10 (2, 1) and the pixel 10 (2, 3) having been output on the second vertical signal line VL2a and the second vertical signal line VL2c is then input to the capacitor 52. Furthermore, the combined pixel signal derived from the pixel 10 (1, 2) and the pixel 10 (3, 2) having been output on the first vertical signal line VL1b is input to the capacitor 53, and the combined pixel signal derived from the pixel 10 (1, 3) and the pixel 10 (3, 3) having been output on the first vertical signal line VL1c is input to the capacitor 55.

The arithmetic unit 50b executes an arithmetic operation so as to add together the pixel signal from the pixel 10 (2, 2) located at the center position, the combined pixel signal derived from the pixels 10 (1, 1) and 10 (3, 1), the combined pixel signal derived from the pixels 10 (2, 1) and 10 (2, 3), the combined pixel signal derived from the pixels 10 (1, 2) and 10 (3, 2) and the combined pixel signal derived from the pixels 10 (1, 3) and 10 (3, 3). The arithmetic unit 50b outputs a sum pixel signal thus generated through the output terminal 63 of the amplification unit 60. Through these measures, a pixel signal with a weight applied to the pixel signal from the pixel 10 located at the central position can be obtained by combining signals from a plurality of pixels 10 disposed consecutively along the column direction and along the row direction in the present embodiment.

In addition to advantageous effects similar to those of the first embodiment, the following advantageous effects are achieved through the embodiment described above.
(3) A plurality of pixels 10 are arranged along the column direction designated as a first direction and along the row direction designated as a second direction. The plurality of pixels 10 include first, second and third pixels disposed in a first column and first, second and third pixels disposed in a second column, with a first signal line and a second signal line (first and second vertical signal lines VL1 and VL2) disposed in correspondence to each of the first and second columns. An arithmetic unit 50 executes an arithmetic operation with signals output to the first and second signal lines corresponding to the first column and signals output to the first and second signal lines corresponding to the second column. As a result, signals from the plurality of pixels 10 arranged along the column direction and along the row direction can be combined. In addition, it is possible to prevent that a weight is applied to a pixel signal from a pixel with the FD thereof achieving a high potential irrespective of the position of pixel, when combining a plurality of pixel signals.

The following variations are also within the scope of the present invention, and one of the variations or a plurality of variations may be adopted in combination with either of the embodiments described above.

Variation 1

While one photoelectric conversion unit is disposed in each pixel in the embodiments described above, a different pixel structure may be adopted and pixels may each include two or more photoelectric conversion units. In such a case, the image sensor 3 will add together signals from at least two photoelectric units among the plurality of photoelectric conversion units and individually and separately read out the pixel signals from all the pixels 10 in the first control mode. In the second control mode, the image sensor 3 will read out signals, each generated by combining signals from a plurality of pixels 10 disposed consecutively along, for instance, the column direction.

Figure 10:
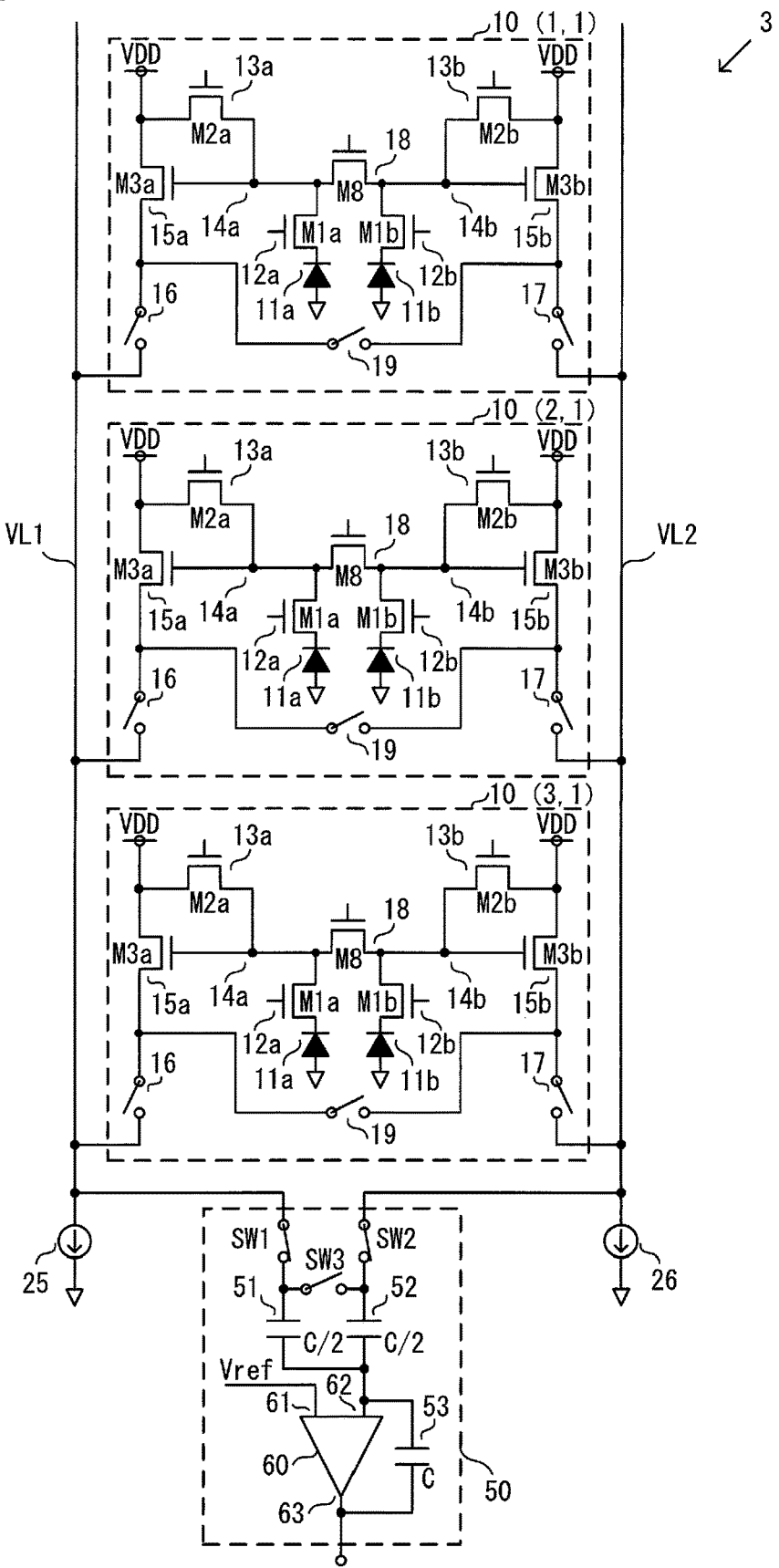

FIG. 10 is a circuit diagram illustrating part of the structure adopted in the image sensor 3 according to variations 1. A pixel 10 includes a first photoelectric conversion unit 11a, a second photoelectric conversion unit 11b, a first transfer unit 12a, a second transfer unit 12b, a first reset unit 13*a*, a second reset unit 13*b*, a first FD 14*a* and a second FD 14*b*. The pixel 10 further includes a first amplifier unit 15*a*, a second amplifier unit 15*b*, a first selection unit 16, a second selection unit 17, an addition switch unit 18 and a coupling switch unit 19.

The first transfer unit 12*a*, which is constituted with a transistor M1*a*, transfers an electric charge resulting from photoelectric conversion at the first photoelectric conversion unit 11*a*, to the first FD 14*a*. The first FD 14*a* accumulates the electric charge transferred to the first FD 14*a*. The first amplifier unit 15*a*, constituted with a transistor M3*a*, amplifies a signal generated based upon the electric charge accumulated in the first FD 14*a* and outputs the amplified signal. The first reset unit 13*a*, constituted with a transistor M2*a*, resets a voltage at the first FD 14*a*. The first selection unit 16, constituted with a transistor, outputs the signal from the first amplifier unit 15*a* to a first vertical signal line VL1.

The second transfer unit 12*b*, which is constituted with a transistor M1*b*, transfers an electric charge resulting from photoelectric conversion at the second photoelectric conversion unit 11*b*, to the second FD 14*b*. The second FD 14*b* accumulates the electric charge transferred to the second FD 14*b*. The second amplifier unit 15*b*, constituted with a transistor M3*b*, amplifies a signal generated based upon the electric charge accumulated in the second FD 14*b* and outputs the amplified signal. The second reset unit 13*b*, constituted with a transistor M2*b*, resets a voltage at the second FD 14*b*. The second selection unit 17, constituted with a transistor, outputs the signal from the second amplifier unit 15*b* to a second vertical signal line VL2.

The addition switch unit 18, which is constituted with a transistor M8, connects (couples) the first FD 14*a* and the second FD 14*b* with each other. The addition switch unit 18, which functions as an adding unit 18, adds together the electric charges resulting from photoelectric conversion in the first and second photoelectric conversion units 11*a* and 11*b* by connecting the first FD 14*a* with the second FD 14*b*. The coupling switch unit 19, which is constituted with a transistor, connects the first amplifier unit 15*a* and the second amplifier unit 15*b* with each other. To describe this in further detail, the coupling switch unit 19 connects the source of the transistor M3*a* constituting the first amplifier unit 15*a* with the source of the transistor M3*b* constituting the second amplifier unit 15*b*. This may be otherwise described as the region between the first amplifier unit 15*a* and the first selection unit 16 and the region between the second amplifier unit 15*b* and the second selection unit 17 connected via the coupling switch unit 19.

In the first control mode, the vertical control unit 70 sets the addition switch unit 18 in an ON state and also sets the coupling switch unit 19 in an ON state at the pixel 10 (1, 1) in the first row. In addition, the vertical control unit 70 sets, for instance, the first selection unit 16 in an ON state and the second selection unit 17 in an OFF state. The electric charge resulting from photoelectric conversion in the first photoelectric conversion unit 11*a* and the electric charge resulting from photoelectric conversion in the second photoelectric conversion unit 11*b* are respectively transferred by the first and second transfer units 12*a* and 12*b*, and are added together and accumulated in the first and second FDs 14*a* and 14*b*. A pixel signal corresponding to the sum of the electric charges added together is generated via the first and second amplifier units 15*a* and 15*b*, the coupling switch unit 19 and the first selection unit 16, and is read out to the first vertical signal line VL1. Pixel signals having been output to the first vertical signal line VL1 are added together via the arithmetic unit 50 as explained earlier.

Once pixel signals derived from the pixels 10 in the first row are read out to the first vertical signal lines VL1, pixels 10 in the second row, the third row and so forth are sequentially selected in units of individual rows and pixel signals are read out from the pixels 10 to the first vertical signal lines VL1 in the image sensor 3. It is to be noted that in case that the first selection units 16 are set in an OFF state and the second selection units 17 are set in an ON state, pixel signals will be read out to the second vertical signal lines VL2 in the first control mode.

It is to be noted that pixel signals from pixels in one of two rows may be read out to the first vertical signal lines VL1 and at the same time, pixel signals from the pixels in the other row may be read out to the second vertical signal lines VL2. In such a case, two arithmetic units 50 may be disposed in correspondence to each pixel column so as to simultaneously execute signal processing on the pixel signals from the pixels in the two rows and output the pixel signals having undergone the signal processing to the control unit 4. The vertical control unit 70 will set the first selection unit 16 in an ON state and the second selection unit 17 in an OFF state at the pixel 10 (1, 1) and set the first selection unit 16 in an OFF state and the second selection unit 17 in an ON state at the pixel 10 (2, 1). The pixel signal from the pixel 10 (1, 1) will be thus read out to the first vertical signal line VL1 and the pixel signal from the pixel 10 (2, 1) will be read out to the second vertical signal line VL2. Through these measures, pixel signals from pixels in two rows can be read out simultaneously.

In the second control mode, the vertical control unit 70 sets the addition switch units 18 and the coupling switch units 19 in an ON state at the pixels 10 (1, 1), 10 (2, 1) and 10 (3, 1) in the first through third rows. In addition, the vertical control unit 70 sets the first selection units 16 in an ON state and the second selection units 17 in an OFF state at the pixels 10 (1, 1) and 10 (3, 1) in the first row and the third row. The vertical control unit 70 also sets the first selection unit 16 in an OFF state and the second selection unit 17 in an ON state at the pixel 10 (2, 1) in the second row. As a result, the pixel signal from the pixel 10 (1, 1) and the pixel signal from the pixel 10 (3, 1) are combined and a combined pixel signal is generated on the first vertical signal line VL1. The pixel signal from the central pixel 10 (2, 1) is read out to the second vertical signal line VL2. The combined pixel signal derived from the pixel 10 (1, 1) and the pixel 10 (3, 1) and the pixel signal from the pixel 10 (2, 1) are added together through an arithmetic operation executed by the arithmetic unit 50 as explained earlier in reference to the embodiments.

Once sum pixel signals derived from the pixels 10 in the first through third rows are read out, the vertical control unit 70 reads out sum pixel signals from the pixels 10 in the fourth through sixth rows. It is to be noted that the pixel signal from the pixel 10 (1, 1) and the pixel signal from the pixel 10 (3, 1) may be read out and combined on the second vertical signal line VL2 and the pixel signal from the central pixel 10 (2, 1) may instead be read out to the first vertical signal line VL1 in the second control mode.

It is to be noted that the pixel structure shown in FIG. 10 enables the control unit 4 to execute processing through which signals are individually and separately read out from the plurality of photoelectric conversion units in each pixel (third control mode). In this mode, the vertical control unit 70 sets the transistor M8 constituting the addition switch unit 18 in an OFF state and also sets the transistor constituting the coupling switch unit 19 in an OFF state. An electric charge resulting from photoelectric conversion in the first photoelectric conversion unit 11a is transferred to the first FD 14a by the first transfer unit 12a. Then, a pixel signal corresponding to the electric charge transferred to the first FD 14a is read out via the first amplifier unit 15a and the first selection unit 16, to the first vertical signal line VL1. In addition, an electric charge resulting from photoelectric conversion in the second photoelectric conversion unit 11b is transferred to the second FD 14b by the second transfer unit 12b. A pixel signal corresponding to the electric charge transferred to the second FD 14b is read out via the second amplifier unit 15b and the second selection unit 17 to the second vertical signal line VL2.

Variation 2

In the embodiments described above, the photoelectric conversion units are each constituted with a photodiode. As an alternative, photoelectric conversion units each constituted with a photoelectric conversion film may be used.

Variation 3

The image sensor and the image-capturing device having been described in reference to the embodiments and the variations thereof may be adopted in a camera, a smart phone, a tablet, a built-in camera in a PC, an on-vehicle camera, a camera installed in an unmanned aircraft (such as a drone or a radio-controlled airplane) and the like.

Variation 4

The image sensor, having been described in reference to the embodiments and the variations thereof, may be adopted in a laminated sensor (laminated image sensor) configured by laminating a plurality of substrates (e.g., a plurality of semiconductor substrates). For instance, the plurality of pixels 10 may be arranged at a first-layer substrate, the electric current sources 25 and 26, the horizontal combining unit 40, the arithmetic units 50 and the A/D conversion units 80 may be disposed at a second-layer substrate and the plurality of vertical signal lines VL may be disposed between the first-layer substrate and the second-layer substrate. As an alternative, the plurality of pixels 10, the electric current sources 25 and 26 and the horizontal combining unit 40 may be disposed at the first-layer substrate and the arithmetic units 50 and the A/D conversion units 80 may be disposed at the second-layer substrate. Furthermore, the laminated sensor may include three or more layers.

While the embodiments and variations thereof have been described, the present invention is not limited to the particulars of these examples. Any other mode conceivable within the scope of the technical teaching of the present invention is within the scope of the present invention.

The disclosure of the following priority application is herein incorporated by reference:

Japanese Patent Application No. 2017-63197 filed Mar. 28, 2017

REFERENCE SIGNS LIST 1 image-capturing device, 3 image sensor, 4 control unit, 10 pixel, 11 photoelectric conversion unit, 15 amplifier unit, 16 first selection unit, 17 second selection unit, 25 first electric current source, 26 second electric current source, 50 arithmetic unit, 70 vertical control unit

The invention claimed is:

1. An image sensor, comprising:
a plurality of pixels arranged along a first direction, each of the plurality of pixels (i) including a photoelectric conversion unit that generates an electric charge through photoelectric conversion of light and (ii) outputting a signal generated based upon the electric charge generated in the photoelectric conversion unit;
a first signal line to which signals from one or more pixels among the plurality of pixels are output;
a second signal line to which a signal from another pixel among the plurality of pixels is output; and
an arithmetic unit that executes an arithmetic operation with the signals from the one or more pixels output to the first signal line and the signal output to the second signal line, wherein:
the one or more pixels include a first pixel and a second pixel; and
the another pixel includes a third pixel disposed between the first pixel and the second pixel.

2. The image sensor according to claim 1, wherein:
the one or more pixels each include a first output unit that outputs the signal generated based upon the electric charge generated in the photoelectric conversion unit to the first signal line; and
the another pixel includes a second output unit that outputs the signal generated based upon the electric charge generated in the photoelectric conversion unit to the second signal line.

3. The image sensor according to claim 2, wherein:
the first output unit switches connection with and disconnection from the first signal line; and
the second output unit switches connection with and disconnection from the second signal line.

4. The image sensor according to claim 2, further comprising:
a first electric current source connected to the first signal line, which provides a first electric current; and
a second electric current source connected to the second signal line, which provides a second electric current.

5. The image sensor according to claim 4, wherein:
the second electric current is greater than the first electric current.

6. The image sensor according to claim 2, wherein:
the first pixel, the second pixel and the third pixel each include the first output unit; and
the third pixel includes the second output unit.

7. The image sensor according to claim 6, further comprising:
a control unit that executes a first control, under which a signal from the first pixel and a signal from the second pixel are both output to the first signal line and a signal from the third pixel is output to the second signal line by setting the first output unit of the first pixel and the first output unit of the second pixel in a connected state and setting the second output unit of the third pixel in a connected state, and a second control under which signals from the first pixel, the second pixel and the third pixel are sequentially output to the first signal line by setting the first output unit of the first pixel, the first output unit of the second pixel and the first output unit of the third pixel in a connected state in sequence.

8. The image sensor according to claim 7, wherein:
the control unit executes a third control, under which a signal from one pixel that is either the first pixel or the second pixel is output to the first signal line and a signal from the third pixel is output to the second signal line by setting the first output unit of the one pixel in a connected state and setting the second output unit of the third pixel in a connected state.

9. The image sensor according to claim 1, wherein:
the one or more pixels include a fourth pixel and a fifth pixel; and
the first pixel, the second pixel and the third pixel are disposed between the fourth pixel and the fifth pixel.

10. The image sensor according to claim 1, wherein:

the plurality of pixels include a fourth pixel and a fifth pixel;

a third signal line to which a signal from the fourth pixel and a signal from the fifth pixel are both output is disposed; and the arithmetic unit executes an arithmetic operation with the signals output to the first signal line, the signal output to the second signal line and the signals output to the third signal line.

11. The image sensor according to claim 1, wherein:

the plurality of pixels each include a plurality of photoelectric conversion units and an adding unit that (i) adds together electric charges generated in the plurality of photoelectric conversion units and (ii) outputs a sum signal generated based upon the electric charges added together by the adding unit; and the arithmetic unit executes an arithmetic operation with the sum signal output to the first signal line and the sum signal output to the second signal line.

12. The image sensor according to claim 11, wherein:

the plurality of pixels each include a first photoelectric conversion unit and a second photoelectric conversion unit; and the image sensor further comprises a control unit that executes a first control, under which the sum signal is output, and a second control, under which a signal generated based upon an electric charge generated in the first photoelectric conversion unit is output to the first signal line and a signal generated based upon an electric charge generated in the second photoelectric conversion unit is output to the second signal line.

13. The image sensor according to claim 1, wherein:

the plurality of pixels are arranged along a column direction designated as the first direction;

the plurality of pixels include the first pixel, the second pixel and the third pixel disposed in a first column and the first pixel, the second pixel and the third pixel disposed in a second column;

the first signal line and the second signal line are disposed in correspondence to each of the first column and the second column; and the arithmetic unit executes an arithmetic operation with signals output to the first signal line and the second signal line corresponding to the first column and signals output to the first signal line and the second signal line corresponding to the second column.

14. The image sensor according to claim 1, wherein:

the plurality of pixels are arranged along a column direction designated as the first direction;

the plurality of pixels include a plurality of pixels arranged in a first column and the first pixel, the second pixel and the third pixel disposed in a second column;

the first signal line and the second signal line are disposed in correspondence to the second column;

a fourth signal line, where signals output from the plurality of pixels in the first column are combined, is disposed in correspondence to the first column; and the arithmetic unit executes an arithmetic operation with signals output to the first signal line, the second signal line and the fourth signal line.

15. The image sensor according to claim 14, wherein:

the plurality of pixels include a plurality of pixels arranged in a third column;

a fifth signal line, where signals output from the plurality of pixels in the third column are combined, is disposed in correspondence to the third column; and the arithmetic unit executes an arithmetic operation with signals output to the first signal line, the second signal line, the fourth signal line and the fifth signal line.

16. An electronic camera, comprising:

the image sensor according to claim 1, and an image generation unit that generates image data based upon signals from the plurality of pixels.

17. The image sensor according to claim 1, wherein:

a signal generated by combining the signals from the one or more pixels is output to the first signal line.

\* \* \* \* \*